US012250195B2

(12) United States Patent
Takei

(10) Patent No.: US 12,250,195 B2
(45) Date of Patent: Mar. 11, 2025

(54) INFORMATION PROCESSING METHOD, NON-TRANSITORY COMPUTER READABLE RECORDING MEDIUM STORING INFORMATION PROCESSING PROGRAM, AND INFORMATION PROCESSING DEVICE FOR DEVICE NAMING

(71) Applicant: Panasonic Intellectual Property Corporation of America, Torrance, CA (US)

(72) Inventor: Yoshihiko Takei, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 18/380,450

(22) Filed: Oct. 16, 2023

(65) Prior Publication Data

US 2024/0048523 A1 Feb. 8, 2024

Related U.S. Application Data

(63) Continuation of application No. PCT/JP2021/048614, filed on Dec. 27, 2021.

(30) Foreign Application Priority Data

Apr. 19, 2021 (JP) ................. 2021-070458

(51) Int. Cl.
*H04L 61/3015* (2022.01)
*H04L 41/12* (2022.01)
*H04L 61/45* (2022.01)

(52) U.S. Cl.
CPC .......... *H04L 61/3015* (2013.01); *H04L 41/12* (2013.01); *H04L 61/45* (2022.05)

(58) Field of Classification Search
CPC ..... H04L 61/3015; H04L 41/12; H04L 61/45; H04L 61/5007; H04L 2101/622;
(Continued)

(56) References Cited

U.S. PATENT DOCUMENTS

| 10,185,544 B1* | 1/2019 | Mutagi ................... G06F 3/167 |
| 2007/0074269 A1* | 3/2007 | Hua ......................... H04N 5/76 725/100 |

(Continued)

FOREIGN PATENT DOCUMENTS

| JP | 2011-4424 | 1/2011 |
| JP | 4981784 | 7/2012 |

(Continued)

OTHER PUBLICATIONS

Feb. 8, 2022 International Search Report issued in International Pat. Appl. No. PCT/JP2021/048614, along with an English translation thereof.

*Primary Examiner* — Abdulkader M Alriyashi
(74) *Attorney, Agent, or Firm* — Greenblum & Bernstein, P.L.C.

(57) ABSTRACT

A device management server acquires, from a device installed in an indoor environment, first identification information for identifying a position specifying device installed in a space set in advance among a plurality of spaces included in the indoor environment, and second identification information for identifying the device installed in the indoor environment, refers to a first table in which the first identification information for identifying the position specifying device and a name of the space in which the position specifying device is installed are associated to each other in advance, specifies a name of a space associated with the first identification information having been acquired, creates a name of the device by using the name of the space having been specified, and registers the second identification infor- (Continued)

mation having been acquired and the name of the device having been created in a second table in association with each other.

11 Claims, 31 Drawing Sheets

(58) Field of Classification Search
CPC ..... H04L 2101/69; H04L 12/28; H04L 67/00; H04Q 9/00
See application file for complete search history.

(56) References Cited

U.S. PATENT DOCUMENTS

| | | | |
|---|---|---|---|
| 2008/0089277 A1* | 4/2008 | Alexander | H04W 8/005 |
| | | | 370/328 |
| 2008/0218334 A1 | 9/2008 | Pitchers et al. | |
| 2012/0195231 A1* | 8/2012 | Fonseca | H04L 41/12 |
| | | | 370/255 |
| 2013/0318188 A1 | 11/2013 | Liekens et al. | |
| 2020/0412568 A1 | 12/2020 | Shinomoto et al. | |
| 2021/0112031 A1 | 4/2021 | VanBlon et al. | |

FOREIGN PATENT DOCUMENTS

| | | |
|---|---|---|
| JP | 2014-506699 | 3/2014 |
| JP | 2015-170000 | 9/2015 |
| JP | 2020-140451 | 9/2020 |
| JP | 2020-188404 | 11/2020 |

* cited by examiner

FIG.3

| REPEATER IDENTIFICATION INFORMATION | POSITION INFORMATION |
|---|---|
| MAC ADDRESS OF FIRST REPEATER | LIVING ROOM |
| MAC ADDRESS OF SECOND REPEATER | KITCHEN |

FIG.4

| DEVICE IDENTIFICATION INFORMATION | NAME OF DEVICE |
|---|---|
| IP ADDRESS OF FIRST DEVICE | LIVING ROOM |
| IP ADDRESS OF SECOND DEVICE | KITCHEN |

FIG.14

| DEVICE IDENTIFICATION INFORMATION | REPEATER IDENTIFICATION INFORMATION | NAME OF DEVICE |
|---|---|---|
| IP ADDRESS OF FIRST DEVICE | MAC ADDRESS OF FIRST REPEATER | LIGHTING DEVICE IN LIVING ROOM |
| IP ADDRESS OF THIRD DEVICE | MAC ADDRESS OF FIRST REPEATER | TELEVISION IN LIVING ROOM |
| IP ADDRESS OF SECOND DEVICE | MAC ADDRESS OF SECOND REPEATER | LIGHTING DEVICE IN KITCHEN |
| IP ADDRESS OF FOURTH DEVICE | MAC ADDRESS OF SECOND REPEATER | REFRIGERATOR IN KITCHEN |

FIG.16

REGISTRATION COMPLETION NOTIFICATION SCREEN

DEVICE IS REGISTERED

| DEVICE IDENTIFICATION INFORMATION | NAME OF DEVICE |
|---|---|
| IP ADDRESS OF FIRST DEVICE | LIGHTING DEVICE IN LIVING ROOM |
| IP ADDRESS OF THIRD DEVICE | TELEVISION IN LIVING ROOM |
| IP ADDRESS OF SECOND DEVICE | LIGHTING DEVICE IN KITCHEN |
| IP ADDRESS OF FOURTH DEVICE | REFRIGERATOR IN KITCHEN |
|  |  |

FIG.19

| POSITION REFERENCE DEVICE IDENTIFICATION INFORMATION | POSITION INFORMATION |
|---|---|
| UUID OF FIRST POSITION REFERENCE DEVICE | LIVING ROOM |
| UUID OF SECOND POSITION REFERENCE DEVICE | KITCHEN |

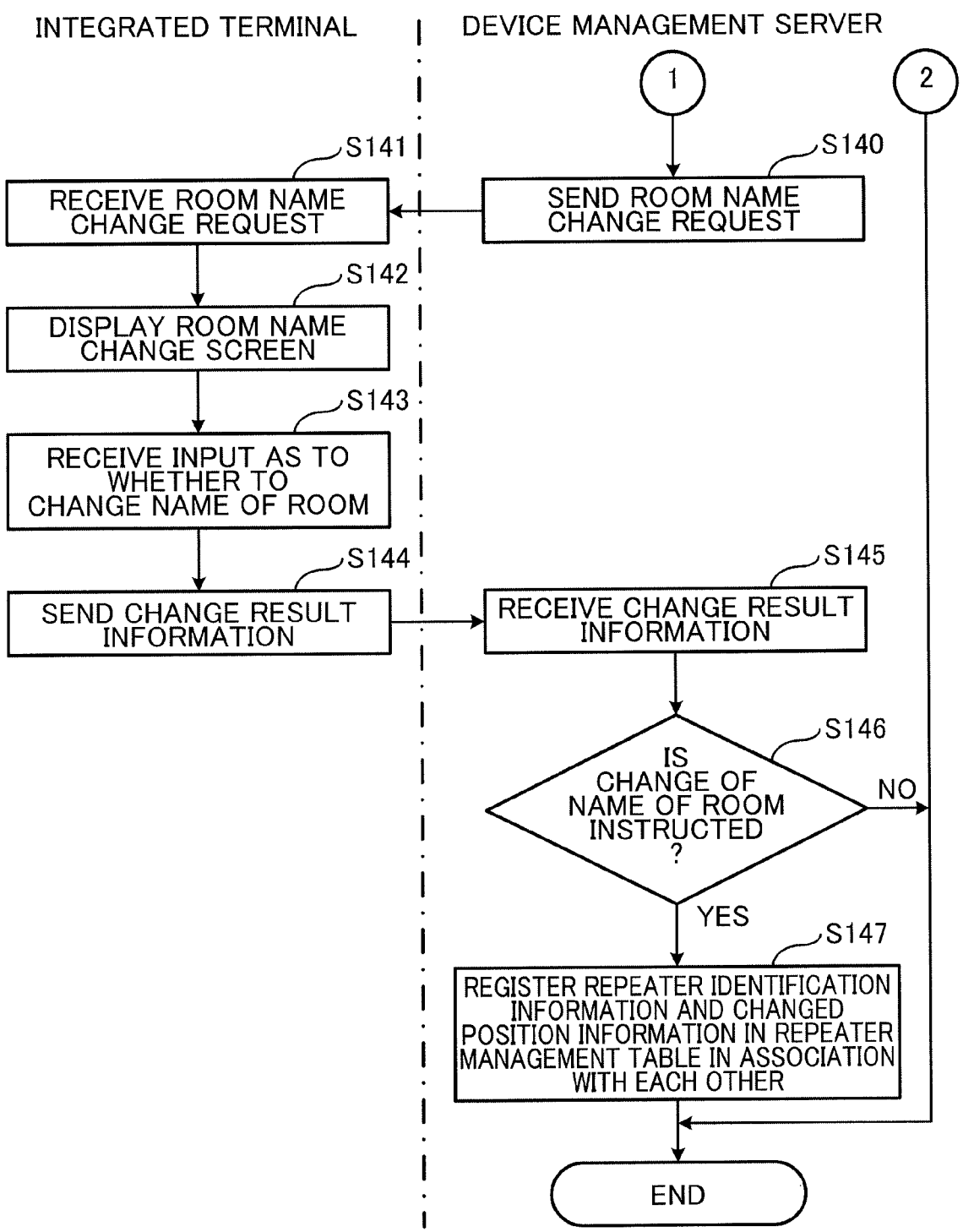

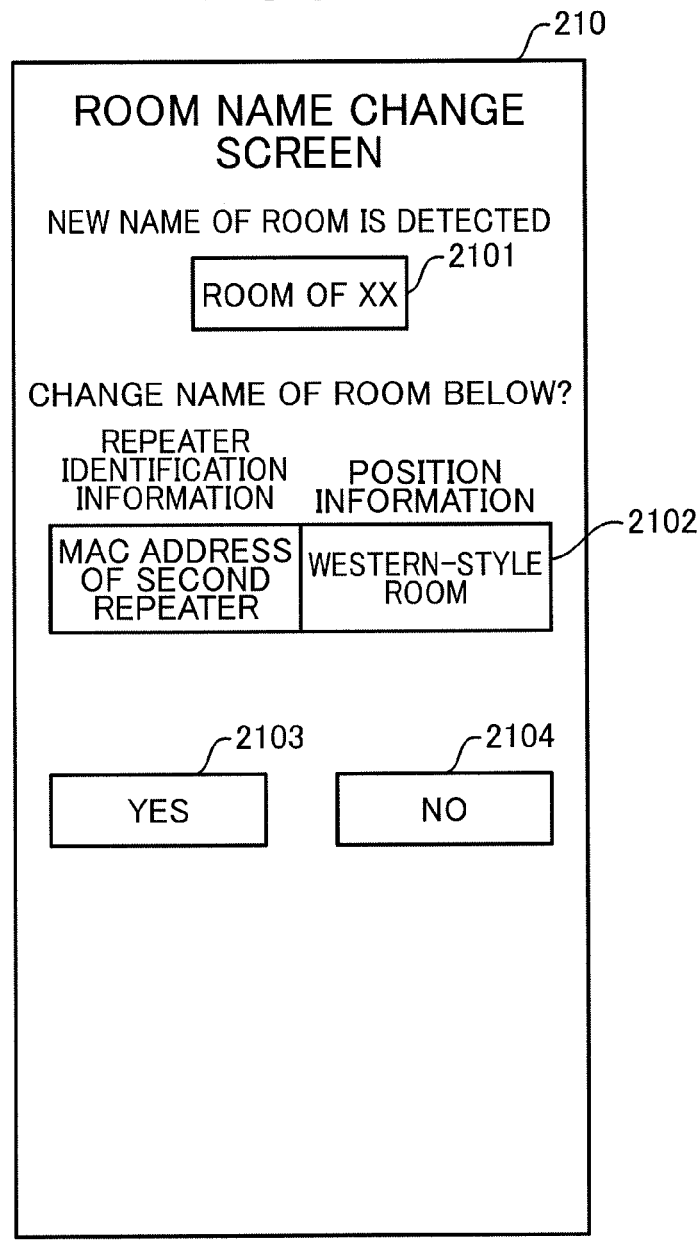

INFORMATION PROCESSING METHOD, NON-TRANSITORY COMPUTER READABLE RECORDING MEDIUM STORING INFORMATION PROCESSING PROGRAM, AND INFORMATION PROCESSING DEVICE FOR DEVICE NAMING

FIELD OF INVENTION

The present disclosure relates to a technique for creating a name of a device installed in an indoor environment.

BACKGROUND ART

For example, Patent Literature 1 discloses a method for determining a relative location of a plurality of wirelessly controllable building service device nodes in a building and a switching control node in a building.

In Patent Literature 1, on the basis of a spatial distribution of building service device nodes indicated by received signal strength indication (RSSI) values, the building service device nodes are grouped into a first group and a second group. The building service device nodes in the first group are allocated for operation by the switching control node, and the building service device nodes in the second group are not allocated.

However, the above conventional technique discloses determining a building service device node to be operated by the switching control node from among the plurality of building service device nodes, but does not disclose creating a name of the building service device node. Therefore, further improvement has been required.

Patent Literature 1: JP 4981784 B2

SUMMARY OF THE INVENTION

The present disclosure has been made to solve the above problem, and an object of the present disclosure is to provide a technique that can easily create a name of a device that can be identified by a user and simplify complicated creation of the name of the device.

An information processing method of the present disclosure includes, by a computer, acquiring, from a device installed in an indoor environment, first identification information for identifying a position specifying device installed in a space set in advance among a plurality of spaces included in the indoor environment, and second identification information for identifying the device installed in the indoor environment, referring to a first table in which the first identification information for identifying the position specifying device and a name of the space in which the position specifying device is installed are associated to each other in advance, and specifying a name of a space associated with the first identification information having been acquired, creating a name of the device by using the name of the space having been specified, and registering the second identification information having been acquired and the name of the device having been created in a second table in association with each other.

The present disclosure can easily create a name of a device that can be identified by a user and simplify a complicated creation of the name of the device.

BRIEF DESCRIPTION OF THE DRAWINGS

FIG. 3 is a diagram illustrating an example of a repeater management table stored in a repeater management table storage according to the first embodiment.

FIG. 4 is a diagram illustrating an example of a device management table stored in a device management table storage according to the first embodiment.

FIG. 14 is a diagram illustrating an example of a device management table stored in a device management table storage according to the second embodiment.

FIG. 16 is a diagram illustrating an example of a registration completion notification screen displayed on an integrated terminal according to the second embodiment.

FIG. 19 is a diagram illustrating an example of a position reference device management table stored in a position reference device management table storage according to the third embodiment.

FIG. 31 is a second flowchart for describing the room name change processing by the device management system according to the fifth embodiment of the present disclosure.

FIG. 32 is a diagram illustrating an example of a room name change screen displayed on an integrated terminal according to the fifth embodiment.

DETAILED DESCRIPTION (Knowledge Underlying Present Disclosure)

Figure 1:
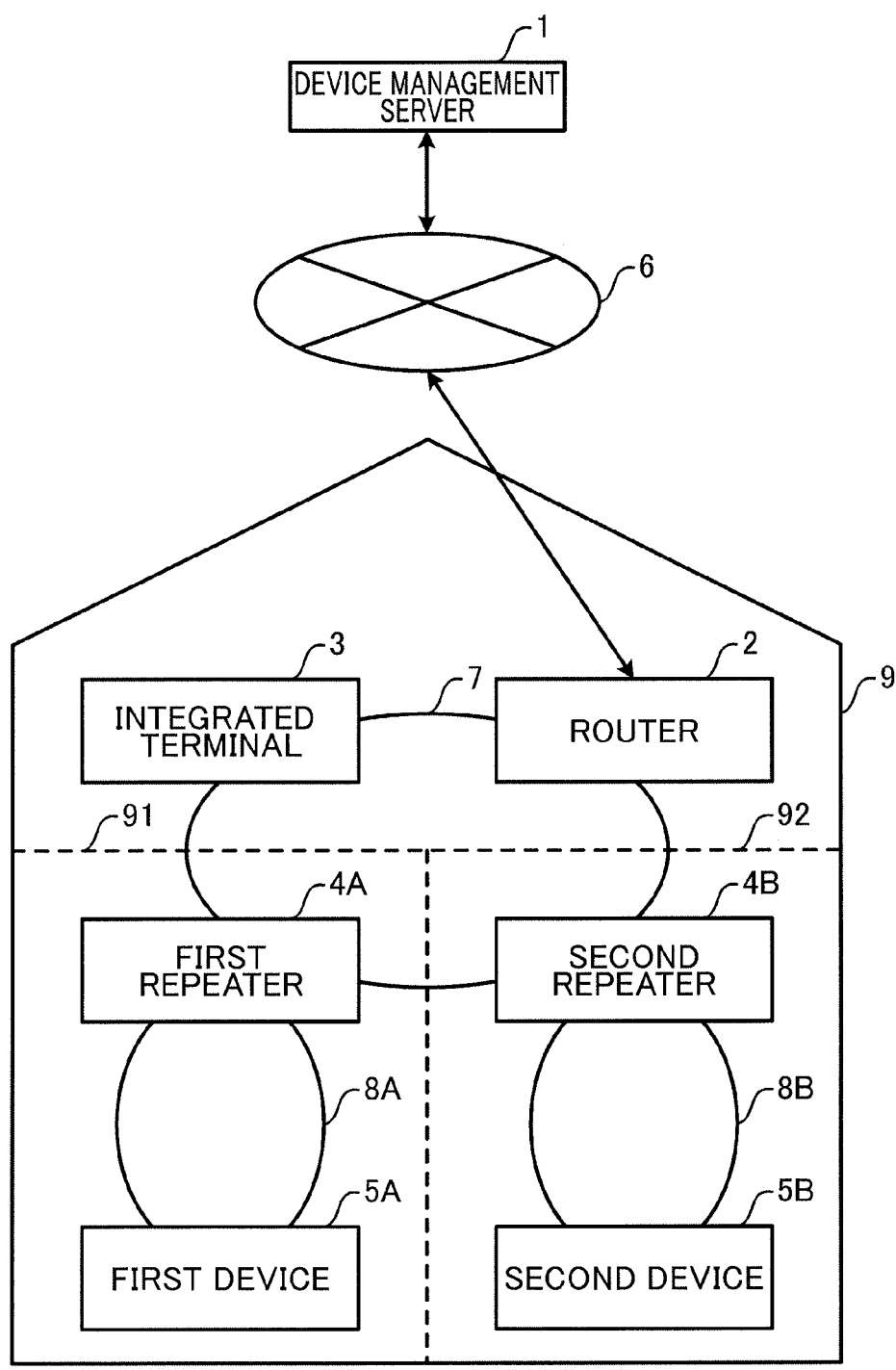
FIG. 1 is a diagram illustrating an example of a configuration of a device management system according to a first embodiment of the present disclosure.

When a user operates a plurality of devices in a residence by using a terminal, the terminal needs to identifiably display the plurality of devices to be operated, and needs to give a name that facilitates identification to each of the plurality of devices. For example, conventionally, an identification number of a device connected to a network is displayed on a terminal, and a user inputs a name to the displayed identification number. However, a plurality of devices are installed in a residence. Therefore, inputting names of the plurality of devices by the user is significantly complicated operation.

Patent Literature 1 discloses determining a building service device node to be operated by a switching control node from among a plurality of building service device nodes, but does not disclose creating a name of the building service device node.

In order to solve the above problem, an information processing method according to one aspect of the present disclosure includes, by a computer, acquiring, from a device installed in an indoor environment, first identification information for identifying a position specifying device installed in a space set in advance among a plurality of spaces included in the indoor environment, and second identification information for identifying the device installed in the indoor environment, referring to a first table in which the first identification information for identifying the position specifying device and a name of the space in which the position specifying device is installed are associated to each other in advance, and specifying a name of a space associated with the first identification information having been acquired, creating a name of the device by using the name of the space having been specified, and registering the second identification information having been acquired and the name of the device having been created in a second table in association with each other.

In this configuration, since the name of the device is created by using the name of the space in which the position specifying device installed in the space set in advance is installed, the name of the device that can be identified by the user can be easily created, and complicated creation of the name of the device can be simplified.

In the information processing method, the position specifying device may be a network connection device used by the device to connect to a network, and the device may be communicably connected to the computer via the network connection device.

In this configuration, since the device is communicably connected to the computer via the network connection device installed in the same space as the device, the name of the device can be created by using the name of the space in which the network connection device is installed.

In the information processing method, the network connection device may be installed in each of two or more spaces among the plurality of spaces, and the specifying of the name of the space may include specifying a name of a space associated with the first identification information for identifying a network connection device installed in a space in which the device is installed among two or more network connection devices installed in the two or more spaces.

In this configuration, since the name of the space in which the network connection device installed in the same space as the device is installed is specified, the name of the device installed in the same space as the network connection device can be created by using the name of the space in which the network connection device is installed.

In the information processing method, the position specifying device may be a signal transmitter that transmits a wireless signal including the first identification information, and the device may receive the wireless signal transmitted by the signal transmitter and send the first identification information included in the wireless signal having been received to the computer.

In this configuration, since the device receives the wireless signal transmitted by the signal transmitter installed in the same space as the device and sends the first identification information included in the received wireless signal to the computer, the name of the device can be created by using the name of the space in which the signal transmitter is installed.

In the information processing method, the signal transmitter may be installed in each of two or more spaces among the plurality of spaces, and the specifying of the name of the space may include specifying a name of a space associated with the first identification information for identifying a signal transmitter installed in a space in which the device is installed among two or more signal transmitters installed in the two or more spaces.

In this configuration, since the name of the space in which the signal transmitter installed in the same space as the device is installed is specified, the name of the device installed in the same space as the signal transmitter can be created by using the name of the space in which the signal transmitter is installed.

In the information processing method, the creating of the name of the device may include creating, as the name of the device, the name of the space having been specified.

In this configuration, since the name of the space in which the position specifying device is installed is created as the name of the device, the user can easily identify the device from the name of the space.

In the information processing method, the creating of the name of the device may include acquiring a type of the device received on a type input screen for displaying the name of the space having been specified and receiving input of the type of the device, and creating the name of the device based on the type of the device having been acquired and the name of the space.

In this configuration, since the name of the device is created on the basis of the input type of the device and the name of the space in which the position specifying device is installed, the user can easily identify the device from the type of the device and the name of the space.

In the information processing method, the acquiring of the first identification information and the second identification information may include further acquiring the type of the device, and the creating of the name of the device may include creating the name of the device by combining the name of the space having been specified and the type of the device having been acquired.

In this configuration, since a name of a device is created by combining the specified name of the space and the acquired type of the device, the user can easily identify the device from a combination of the name of the space and the type of the device.

The information processing method may further include acquiring audio information in the indoor environment, extracting a name of a space included in the audio information, and in a case where the name of the space having been extracted does not exist in the name of the space associated with the first table, outputting a change input screen for presenting the name of the space having been extracted to a user and receiving a change by the user of the name of the space associated with the first table.

A designation of a space registered in the first table may change over time. Therefore, when a name of a space not registered in the first table is uttered in the indoor environment, the name of the space registered in the first table is changed to the name of the space not registered in the first table extracted from the audio information, and thus the name of the device according to the current designation of the space can be created.

The information processing method may include counting a number of times names of the plurality of spaces have been uttered based on the name of the space having been extracted, in which the outputting of the change input screen may include, in a case where the name of the space having been extracted is not included in the name of the space associated with the first table, specifying a name of a space in which the number of times of utterance is smaller than a threshold among the names of the plurality of spaces, and outputting the change input screen for receiving input by the user as to whether to change the name of the space having been specified to the name of the space having been extracted.

Among the names of the plurality of spaces registered in the first table, the name of the space that has a smaller number of times of utterance than the threshold is likely to be the name of the space that is no longer referred to by the user. Therefore, since a name of a space that has a smaller number of times of utterance than the threshold among the names of the plurality of spaces registered in the first table is changed to the name of the space not registered in the first table extracted from the audio information, and the name of the device according to the current designation of the space can be created.

The information processing method may further include acquiring sensing data from a sensor that detects a person, the sensor being installed in each of the plurality of spaces, calculating a frequency of presence of the person in each of the plurality of spaces based on the sensing data having been acquired, and setting the threshold to be lower for a space in which the frequency having been calculated is higher.

A name of a room that has a high frequency of presence of a person is referred to less frequently by a person. Therefore, by setting the threshold lower for a room that has a higher frequency of detection of a person, it is possible to prevent a name of a room that has a higher frequency of presence of the user from being changed.

The present disclosure can be implemented not only as the information processing method for performing characteristic processing as described above, but also as an information processing device or the like having a characteristic configuration corresponding to a characteristic method performed according to the information processing method. The present disclosure can also be implemented as a computer program that causes a computer to execute characteristic processing included the information processing method described above. Thus, even other aspects below can achieve an effect as in the information processing method.

A non-transitory computer readable recording medium storing an information processing program according to another aspect of the present disclosure causes a computer to perform processing of acquiring, from a device installed in an indoor environment, first identification information for identifying a position specifying device installed in a space set in advance among a plurality of spaces included in the indoor environment, and second identification information for identifying the device installed in the indoor environment, referring to a first table in which the first identification information for identifying the position specifying device and a name of the space in which the position specifying device is installed are associated to each other in advance, and specifying a name of a space associated with the first identification information having been acquired, creating a name of the device by using the name of the space having been specified, and registering the second identification information having been acquired and the name of the device having been created in a second table in association with each other.

An information processing device according to another aspect of the present disclosure includes an acquisition unit that acquires, from a device installed in an indoor environment, first identification information for identifying a position specifying device installed in a space set in advance among a plurality of spaces included in the indoor environment, and second identification information for identifying the device installed in the indoor environment, a specifying unit that refers to a first table in which the first identification information for identifying the position specifying device and a name of the space in which the position specifying device is installed are associated to each other in advance, and specifies a name of a space associated with the first identification information having been acquired, a creating unit that creates a name of the device by using the name of the space having been specified, and a registration processing unit that registers the second identification information having been acquired and the name of the device having been created in a second table in association with each other.

Embodiments of the present disclosure will be described below with reference to the accompanying drawings. The following embodiments are examples of realization of the present disclosure, and are not intended to limit the technical scope of the present disclosure.

First Embodiment

FIG. 1 is a diagram illustrating an example of a configuration of a device management system according to a first embodiment of the present disclosure. The device management system illustrated in FIG. 1 includes a device management server 1, a router 2, an integrated terminal 3, a first repeater 4A, a second repeater 4B, a first device 5A, and a second device 5B. The router 2, the integrated terminal 3, the first repeater 4A, the second repeater 4B, the first device 5A, and the second device 5B are installed in a residence 9.

The device management server 1 manages a repeater management table in which at least one repeater identification information for identifying at least one repeater installed in the residence 9 is associated with a name of a space (room) in which the at least one repeater is installed, and a device management table in which at least one device identification information for identifying at least one device installed in the residence 9 is associated with a name of the at least one device. A configuration of the device management server 1 will be described later.

The residence 9 includes a plurality of rooms (spaces). The residence 9 includes a first room (first space) 91 and a second room (second space) 92. The first room 91 is, for example, a living room, and the second room 92 is, for example, a kitchen.

The router 2 is installed in the residence 9. The router 2 is a communication device that connects a wide area network (WAN) 6 and a first local area network (LAN) 7 and relays data. The WAN 6 is, for example, the Internet such as a general telephone line or an integrated services digital network (ISDN), and the first LAN 7 is, for example, power line communication (PLC) using a power line as a communication line. The first LAN 7 includes the router 2, the integrated terminal 3, the first repeater 4A, and the second repeater 4B.

The integrated terminal 3 is installed in, for example, a living room in the residence 9, and is a controller for integrally controlling the first device 5A and the second device 5B used in the residence 9. The integrated terminal 3 includes a display and an input unit. The integrated terminal 3 may include a touch panel having functions of a display and an input unit. The integrated terminal 3 receives operation by a user of the first device 5A and the second device 5B, and controls the first device 5A and the second device 5B in accordance with a content of the received operation.

The integrated terminal 3 displays names of the first device 5A and the second device 5B when receiving operation by the user of the first device 5A and the second device 5B. The names of the first device 5A and the second device 5B displayed on the integrated terminal 3 are the names of the first device 5A and the second device 5B registered in a device management table of the device management server 1. The user selects the name of a device to be operated from among the displayed names of the first device 5A and the second device 5B.

The first repeater 4A is installed in a predetermined room (space) among the plurality of rooms (spaces) included in the residence 9 (indoor environment). The first repeater 4A is a network connection device used by the first device 5A to connect to a network. The first repeater 4A is installed on an outlet provided on a wall of the first room 91 in the residence 9 or a wiring device (hook sealing) provided on a ceiling of the first room 91. The network connection device is, for example, a power line communication device for connecting the first LAN 7 and a second LAN 8A.

The second LAN 8A includes the first repeater 4A and the first device 5A. A power plug or a LAN cable of the first device 5A is inserted into the first repeater 4A to communicably connect the first repeater 4A and the first device 5A to each other. The first repeater 4A communicably connects the router 2 and the first device 5A to each other, and communicably connects the integrated terminal 3 and the first device 5A to each other. The second LAN 8A is not necessarily a wired LAN, and may be a wireless LAN.

The second repeater 4B is installed in a predetermined room (space) among the plurality of rooms (spaces) included in the residence 9 (indoor environment). The second repeater 4B is a network connection device used by the second device 5B to connect to a network. The second repeater 4B is installed on an outlet provided on a wall of the second room 92 in the residence 9 or a wiring device (hook sealing) provided on a ceiling of the second room 92. The network connection device is, for example, a power line communication device for connecting the first LAN 7 and the second LAN 8B.

The second LAN 8B includes the second repeater 4B and the second device 5B. A power plug or a LAN cable of the second device 5B is inserted into the second repeater 4B to communicably connect the second repeater 4B and the second device 5B to each other. The second repeater 4B communicably connects the router 2 and the second device 5B to each other, and communicably connects the integrated terminal 3 and the second device 5B to each other. The second LAN 8B is not necessarily a wired LAN, and may be a wireless LAN.

The first repeater 4A and the second repeater 4B are examples of a position specifying device.

In the first embodiment, not only the first device 5A but also a plurality of devices installed in the first room 91 may be connected to the first repeater 4A. In a similar manner, in the first embodiment, not only the second device 5B but also a plurality of devices installed in the second room 92 may be connected to the second repeater 4B. A repeater may also be installed in a room other than the first room 91 and the second room 92 in the residence 9.

The first device 5A and the second device 5B may be, for example, housing equipment such as a lighting device, a device for opening and closing a shutter, or a hot water supply installed in the residence 9, and may be, for example, a home appliance such as a television, a refrigerator, a washing machine, or a microwave oven installed in the residence 9. The first device 5A is installed in the first room 91. The second device 5B is installed in the second room 92 different from the first room 91. The first device 5A is communicably connected to the device management server 1 via the first repeater 4A. The second device 5B is communicably connected to the device management server 1 via the second repeater 4B.

Figure 2:
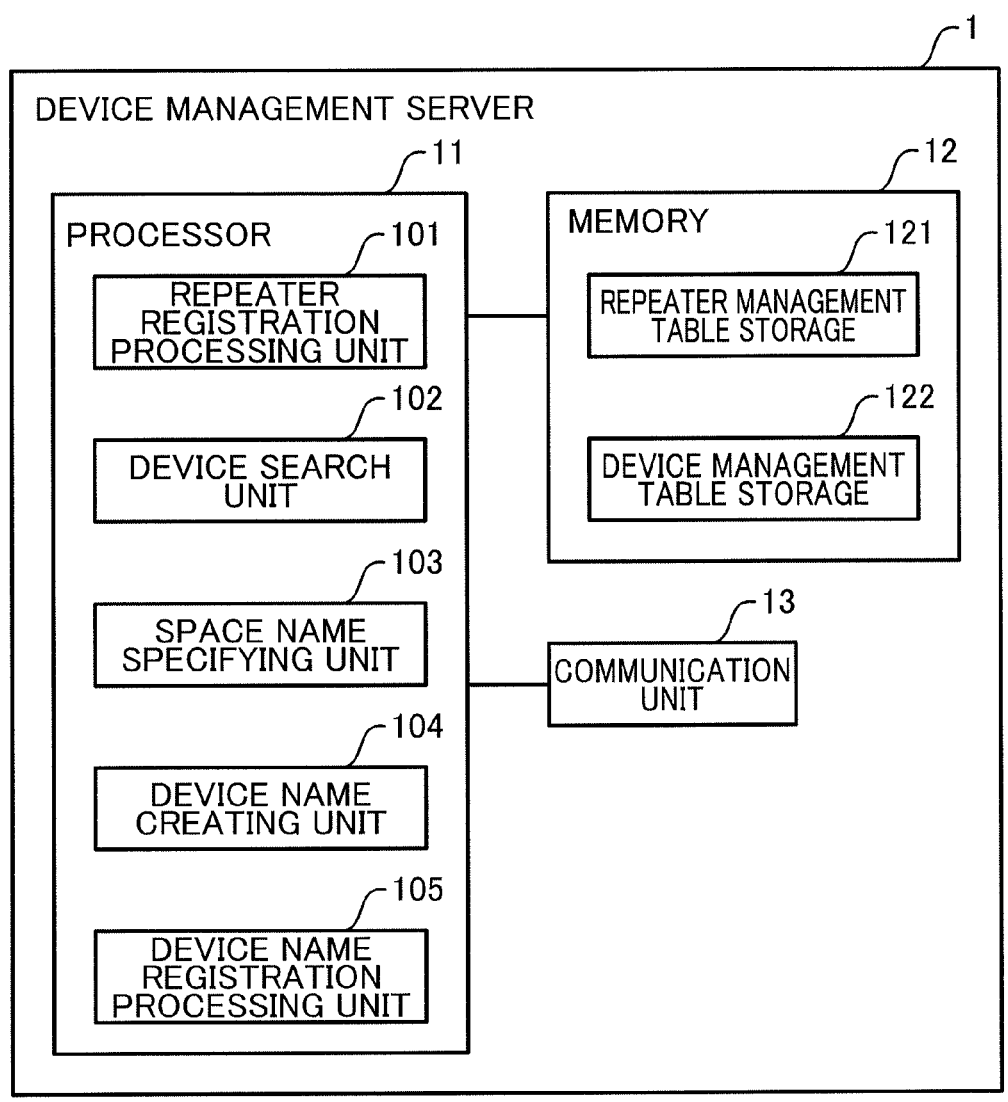
FIG. 2 is a diagram illustrating an example of a configuration of a device management server according to the first embodiment of the present disclosure.

FIG. 2 is a diagram illustrating an example of a configuration of the device management server 1 according to the first embodiment of the present disclosure.

The device management server 1 illustrated in FIG. 2 includes a processor 11, a memory 12, and a communication unit 13.

The processor 11 is, for example, a central processing unit (CPU). The processor 11 implements a repeater registration processing unit 101, a device search unit 102, a space name specifying unit 103, a device name creating unit 104, and a device name registration processing unit 105.

The memory 12 is a storage device capable of storing various types of information, such as a random access memory (RAM), a hard disk drive (HDD), a solid state drive (SSD), or a flash memory. The memory 12 implements a repeater management table storage 121 and a device management table storage 122.

The communication unit 13 sends various information to the integrated terminal 3, the first repeater 4A, the second repeater 4B, the first device 5A, and the second device 5B, and receives various information from the integrated terminal 3, the first repeater 4A, the second repeater 4B, the first device 5A, and the second device 5B.

The repeater registration processing unit 101 registers, in the repeater management table (first table), at least one repeater identification information for identifying at least one repeater and a name of a room (space) in the residence 9 where the repeater is installed in association with each other.

Here, the integrated terminal 3 sends, to the device management server 1, a repeater registration request for registering at least one repeater identification information and a name of a room in the repeater management table in association with each other. The repeater identification information includes, for example, a MAC address of the repeater. The communication unit 13 of the device management server 1 receives the repeater registration request sent by the integrated terminal 3. When the repeater registration request is received by the communication unit 13, the repeater registration processing unit 101 broadcasts a repeater search command for searching for at least one repeater connected to the first LAN 7. Upon receipt of the repeater search command, the repeater sends response information to the device management server 1. At this time, the response information includes repeater identification information for identifying the repeater. The repeater identification information includes a MAC address of the repeater of a sender. The communication unit 13 sends at least one repeater identification information included in the received at least one response information to the integrated terminal 3.

The integrated terminal 3 displays the received at least one repeater identification information, and receives input of position information for the at least one repeater identification information. The position information includes the name of the room (space) in which the repeater is installed. The integrated terminal 3 sends the at least one repeater identification information and the position information to the device management server 1. The communication unit 13 of the device management server 1 receives the at least one repeater identification information and the position information sent by the integrated terminal 3. The repeater registration processing unit 101 registers, in the repeater management table, at least one repeater identification information for identifying at least one repeater and a name of a room (space) in the residence 9 where the at least one repeater is installed in association with each other.

The repeater management table storage 121 stores the repeater management table (first table) in which repeater identification information (first identification information) for identifying a repeater and a name of a room (space) in which the repeater is installed are associated with each other in advance.

FIG. 3 is a diagram illustrating an example of the repeater management table stored in the repeater management table storage 121 according to the first embodiment.

The repeater management table associates at least one repeater identification information with a name of a room in which the at least one repeater is installed. The repeater management table illustrated in FIG. 3 associates, for example, a MAC address of the first repeater 4A with the living room, and associates a MAC address of the second repeater 4B with the kitchen. The MAC address of the first repeater 4A is repeater identification information for identifying the first repeater 4A, and the MAC address of the second repeater 4B is repeater identification information for identifying the second repeater 4B. The living room is a name of a room in which the first repeater 4A is installed, and the kitchen is a name of a room in which the second repeater 4B is installed.

The device search unit 102 broadcasts a device search command for searching for a device connected to the first LAN 7 and the second LANs 8A and 8B. Upon receipt of the device search command, the device sends response information to the device management server 1. At this time, the response information sent by the device includes device identification information for identifying the device. The device identification information includes an IP address of the device of a sender. The response information sent by the device is sent to the device management server 1 via the repeater. Thus, the repeater receives the response information sent by the device, and sends the received response information to the device management server 1. At this time, the repeater includes repeater identification information for identifying the repeater in the received response information. Then, the repeater sends the response information including the repeater identification information to the device management server 1. The repeater identification information includes a MAC address of the repeater that relays the response information.

The communication unit 13 acquires, from a device, repeater identification information (first identification information) for identifying a repeater (position specifying device) installed in a predetermined room (space) among a plurality of rooms (spaces) included in the indoor environment, and device identification information (second identification information) for identifying a device installed in the indoor environment. That is, the communication unit 13 receives the response information including the repeater identification information and the device identification information.

The space name specifying unit 103 refers to the repeater management table (first table) in which the repeater identification information (first identification information) for identifying a repeater (position specifying device) and a name of a room (space) in which the repeater (position specifying device) is installed are associated in advance, and specifies the name of the room (space) associated with the acquired repeater identification information (first identification information).

The repeaters (the first repeater 4A and the second repeater 4B) are installed in two or more rooms (spaces) among the plurality of rooms (spaces). The space name specifying unit 103 specifies a name of a room (space) associated with the repeater identification information (first identification information) for identifying a repeater installed in a room (space) in which a device is installed, among two or more repeaters respectively installed in the two or more rooms (spaces).

The device name creating unit 104 creates a name of the device by using the name of the room (space) specified by the space name specifying unit 103. The device name creating unit 104 creates the name of the room (space) specified by the space name specifying unit 103 as the name of the device.

The device name registration processing unit 105 registers the device identification information (second identification information) acquired by the communication unit 13 and the name of the device created by the device name creating unit 104 in the device management table (second table) in association with each other.

The device management table storage 122 stores the device management table (second table) in which the device identification information for identifying a device (second identification information) is associated with the name of the device.

FIG. 4 is a diagram illustrating an example of the device management table stored in the device management table storage 122 according to the first embodiment.

The device management table associates at least one device identification information with a name of at least one device. The device management table illustrated in FIG. 4 associates, for example, an IP address of the first device 5A with the living room, and associates an IP address of the second device 5B with the kitchen. The IP address of the first device 5A is device identification information for identifying the first device 5A, and the IP address of the second device 5B is device identification information for identifying the second device 5B. The living room is the name of the first device 5A, and the kitchen is the name of the second device 5B.

In the first embodiment, the name of the room in which the first repeater 4A is installed is created as the name of the first device 5A, and the name of the room in which the second repeater 4B is installed is created as the name of the second device 5B.

The following is a description of repeater registration processing by the device management system according to the first embodiment of the present disclosure.

Figure 5:
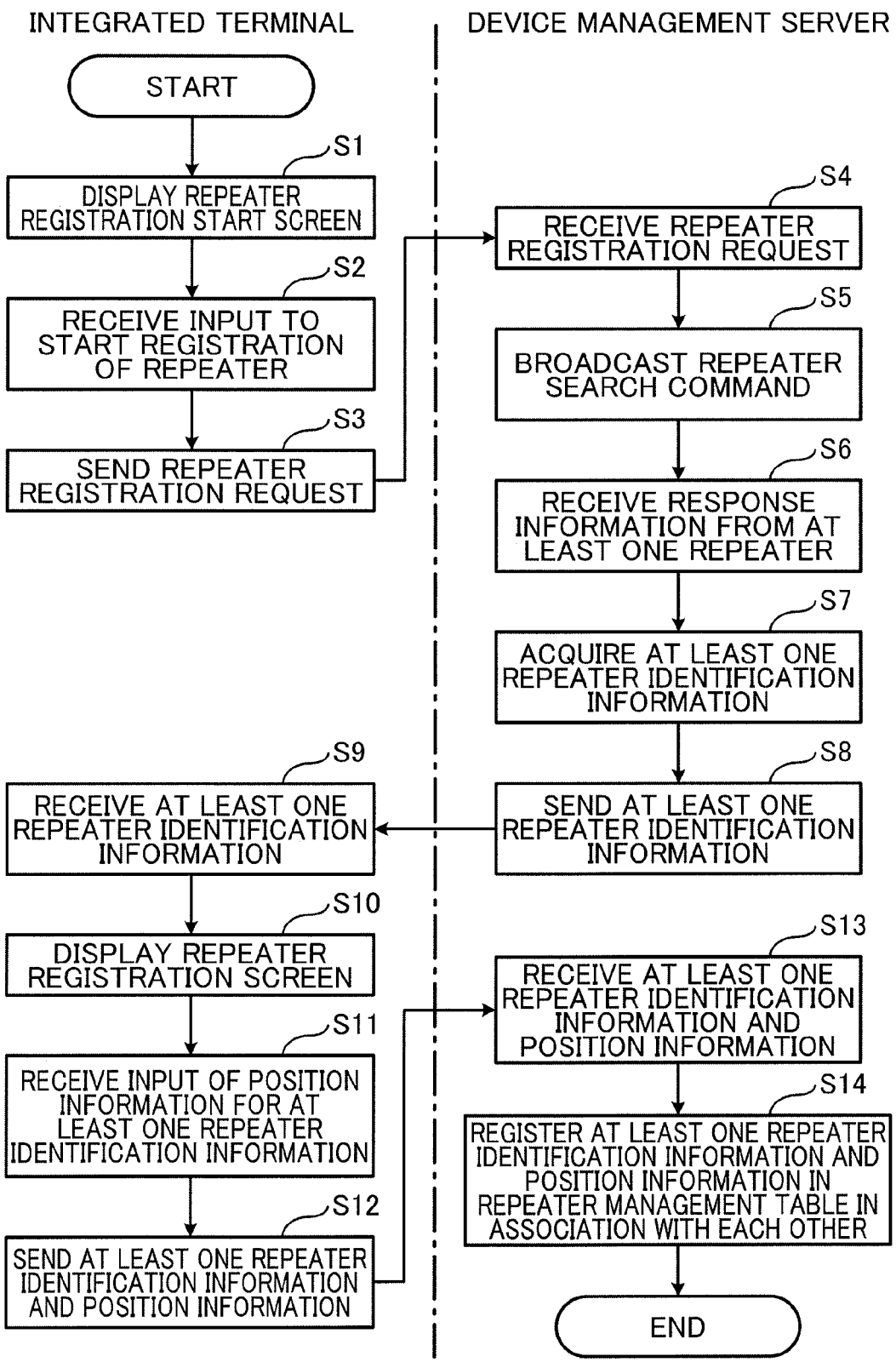
FIG. 5 is a flowchart for describing repeater registration processing by the device management system according to the first embodiment of the present disclosure.

FIG. 5 is a flowchart for describing the repeater registration processing by the device management system according to the first embodiment of the present disclosure.

First, in step S1, the integrated terminal 3 displays a repeater registration start screen for starting registration of at least one repeater identification information for identifying at least one repeater and the name of the room in which the repeater is installed in the repeater management table.

Next, in step S2, the integrated terminal 3 receives input to start registration of at least one repeater connected to the first LAN 7.

Next, in step S3, the integrated terminal 3 sends, to the device management server 1, a repeater registration request for registering at least one repeater identification information and the name of the room in which the at least one repeater is installed in the repeater management table in association with each other.

Figure 6:
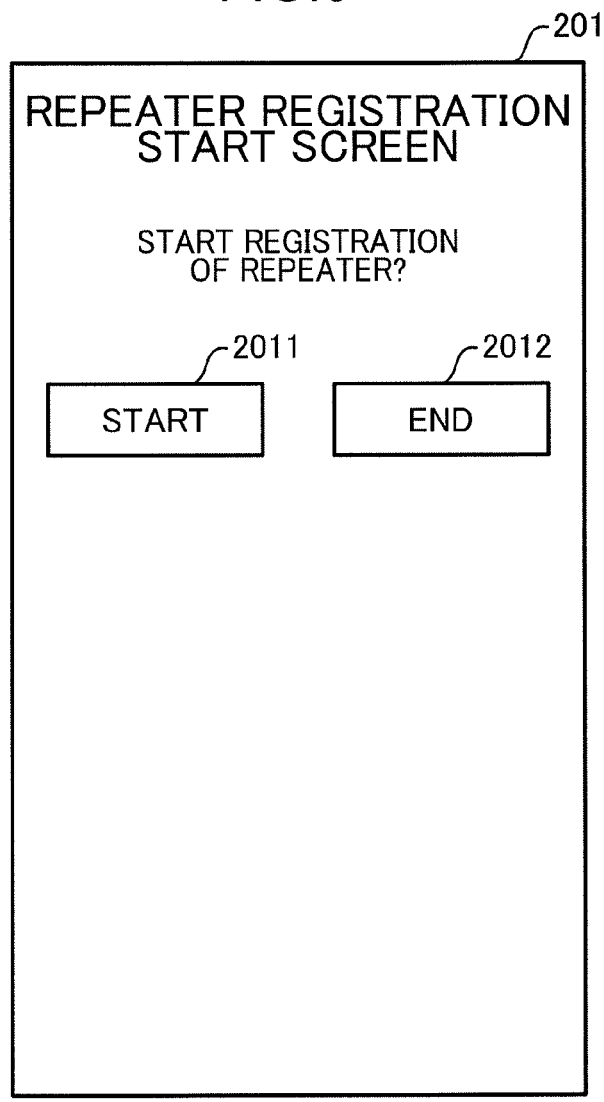
FIG. 6 is a diagram illustrating an example of a repeater registration start screen displayed on an integrated terminal according to the first embodiment.

FIG. 6 is a diagram illustrating an example of the repeater registration start screen displayed on the integrated terminal 3 according to the first embodiment.

The integrated terminal 3 displays a repeater registration start screen 201 illustrated in FIG. 6. The repeater registration start screen 201 includes a registration start button 2011 for starting registration of at least one repeater connected to the first LAN 7 and a registration end button 2012 for ending registration of at least one repeater connected to the first LAN 7. On the repeater registration start screen 201, the user who uses the residence 9 touches the registration start button 2011 when starting registration of at least one repeater connected to the first LAN 7. When the registration start button 2011 is touched, a repeater registration request is sent to the device management server 1.

On the other hand, on the repeater registration start screen 201, the user who uses the residence 9 touches the registration end button 2012 when not starting registration of at least one repeater connected to the first LAN 7. When the registration end button 2012 is touched, the integrated terminal 3 displays a screen immediately before the repeater registration start screen 201, for example, a menu screen.

Next, referring to FIG. 5, in step S4, the communication unit 13 of the device management server 1 receives the repeater registration request sent by the integrated terminal 3.

Then, in step S5, the repeater registration processing unit 101 broadcasts a repeater search command for searching for at least one repeater connected to the first LAN 7. The communication unit 13 designates a broadcast address of the first LAN 7 and sends the repeater search command to all the repeaters connected to the first LAN 7. Upon receipt of the repeater search command, the repeater sends response information including repeater identification information for identifying a repeater to the device management server 1. The repeater identification information includes, for example, a MAC address of the repeater. The repeater identification information may be an IP address or a serial number of the repeater, and may be any information that can uniquely identify the repeater.

Subsequently, in step S6, the communication unit 13 receives response information from at least one repeater connected to the first LAN 7.

Next, in step S7, the repeater registration processing unit 101 acquires at least one repeater identification information from at least one response information received by the communication unit 13.

Then, in step S8, the repeater registration processing unit 101 sends the acquired at least one repeater identification information to the integrated terminal 3 via the communication unit 13. The communication unit 13 sends the at least one repeater identification information acquired by the repeater registration processing unit 101 to the integrated terminal 3.

After that, in step S9, the integrated terminal 3 receives the at least one repeater identification information sent by the device management server 1.

Next, in step S10, the integrated terminal 3 displays a repeater registration screen for displaying the received at least one repeater identification information and receiving input of position information for the at least one repeater identification information.

Then, in step S11, the integrated terminal 3 receives input of the position information for the at least one repeater identification information.

In step S12, the integrated terminal 3 sends at least one repeater identification information and position information input by the user to the device management server 1.

Figure 7:
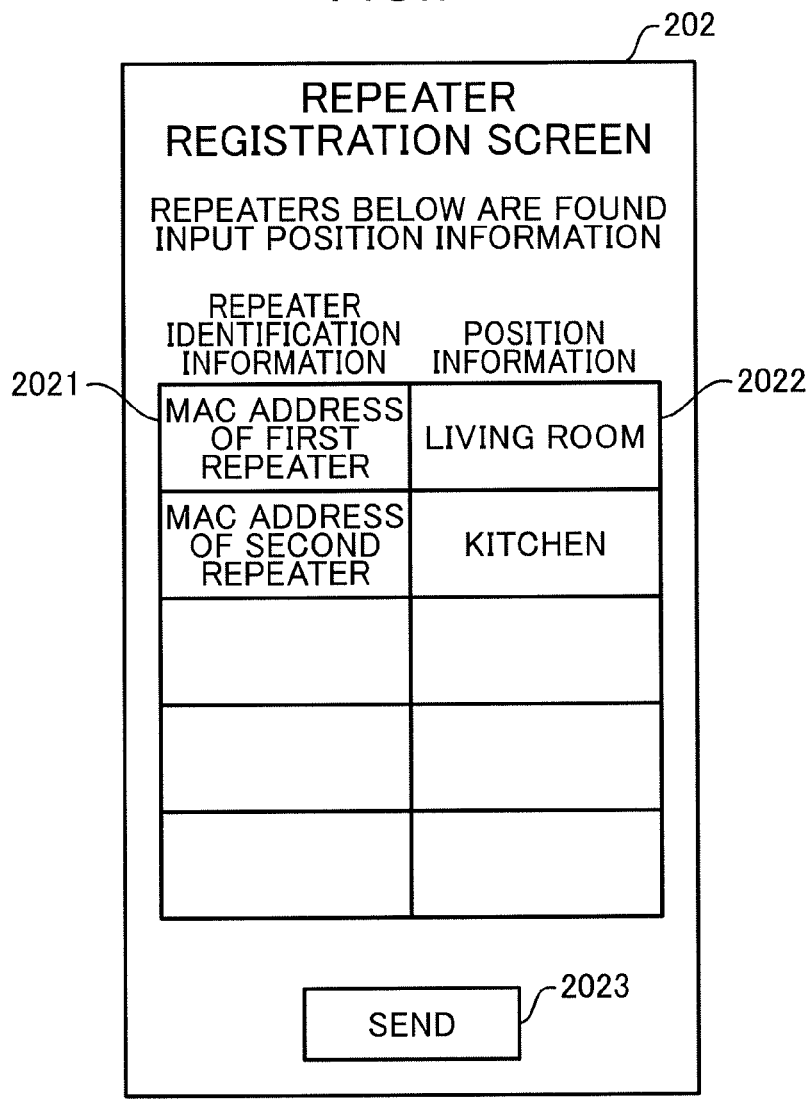
FIG. 7 is a diagram illustrating an example of a repeater registration screen displayed on the integrated terminal according to the first embodiment.

FIG. 7 is a diagram illustrating an example of the repeater registration screen displayed on the integrated terminal 3 according to the first embodiment.

The integrated terminal 3 displays a repeater registration screen 202 illustrated in FIG. 7. The repeater registration screen 202 includes an identification information presentation field 2021 for presenting at least one repeater identification information and a position information input field 2022 for inputting position information corresponding to the at least one repeater identification information. On the repeater registration screen 202, the user who uses the residence 9 inputs position information corresponding to at least one repeater identification information to the position information input field 2022. The repeater identification information is, for example, a MAC address of the repeater, and the position information is, for example, a name of a room in which the repeater is installed.

Here, the first repeater 4A and the second repeater 4B are connected to the first LAN 7, and the MAC address of the first repeater 4A and the MAC address of the second repeater 4B are displayed in the identification information presentation field 2021. As the position information for the MAC address of the first repeater 4A, the living room which is the name of the room in which the first repeater 4A is installed is input in the position information input field 2022. As the position information for the MAC address of the second repeater 4B, the kitchen which is the name of the room in which the second repeater 4B is installed is input in the position information input field 2022.

The repeater registration screen 202 includes a send button 2023 for sending at least one repeater identification information and each input position information. When the send button 2023 is touched, at least one repeater identification information and position information are sent to the device management server 1.

Next, referring to FIG. 5, in step S13, the communication unit 13 of the device management server 1 receives the at least one repeater identification information and the position information sent by the integrated terminal 3.

Then, in step S14, the repeater registration processing unit 101 registers the at least one repeater identification information and the position information (name of room) in the repeater management table in association with each other.

The following is a description of device name registration processing by the device management system according to the first embodiment of the present disclosure.

Figure 8:
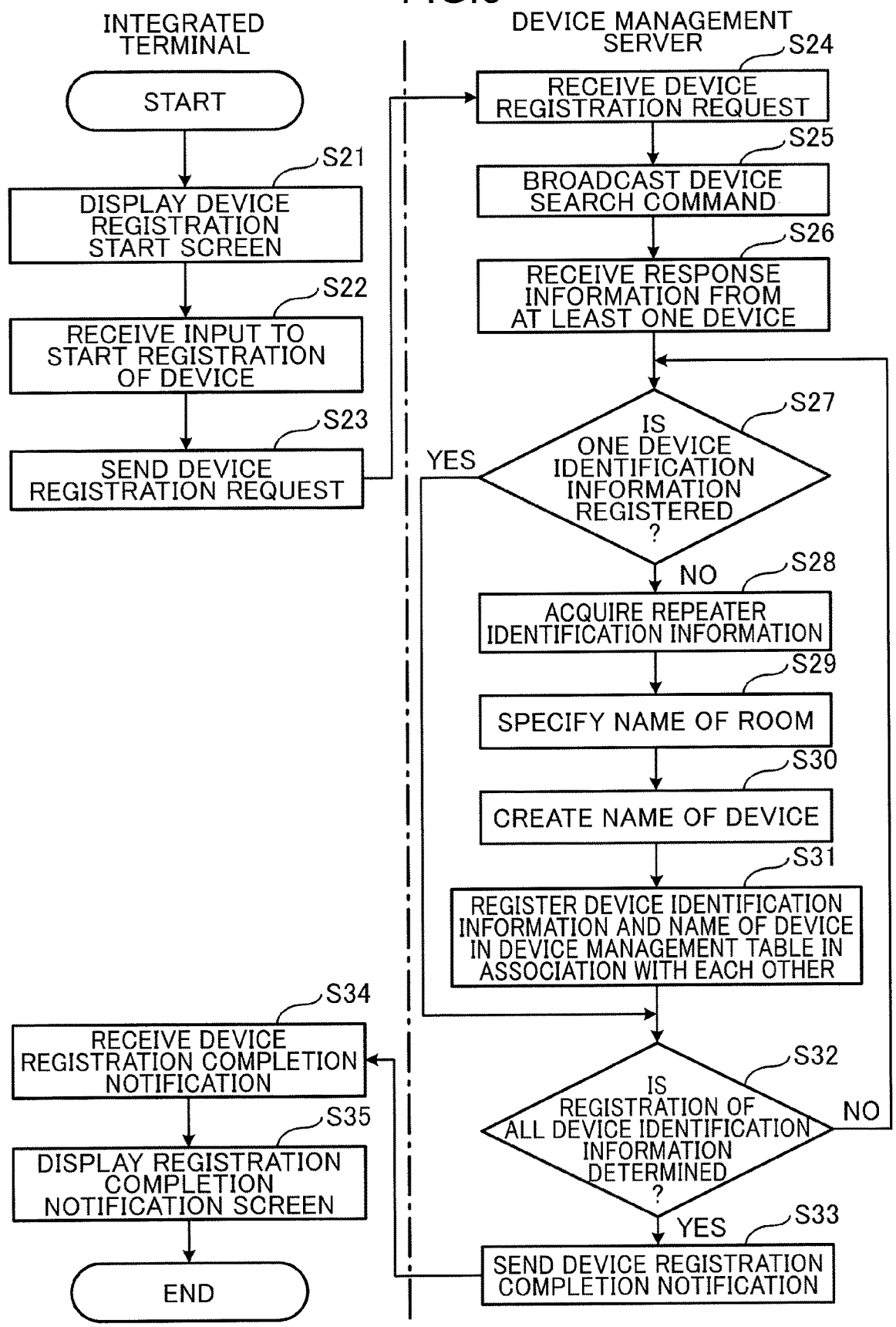
FIG. 8 is a flowchart for describing device name registration processing by the device management system according to the first embodiment of the present disclosure.

FIG. 8 is a flowchart for describing the device name registration processing by the device management system according to the first embodiment of the present disclosure.

First, in step S21, the integrated terminal 3 displays a device registration start screen for starting registration of at least one device identification information for identifying at least one device and the name of the device in the device management table.

Next, in step S22, the integrated terminal 3 receives input to start registration of at least one device connected to the first LAN 7 and the second LANs 8A and 8B.

Then, in step S23, the integrated terminal 3 sends, to the device management server 1, a device registration request for registering at least one device identification information and a name of a device in the device management table in association with each other.

Figure 9:
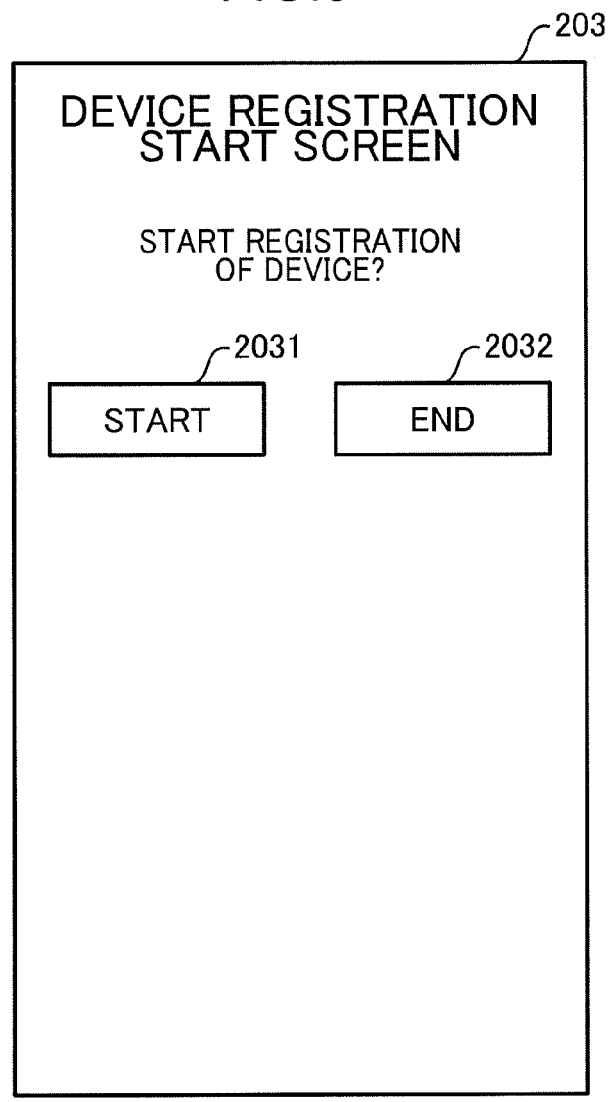
FIG. 9 is a diagram illustrating an example of a device registration start screen displayed on the integrated terminal according to the first embodiment.

FIG. 9 is a diagram illustrating an example of the device registration start screen displayed on the integrated terminal 3 according to the first embodiment.

The integrated terminal 3 displays a device registration start screen 203 illustrated in FIG. 9. The device registration start screen 203 includes a registration start button 2031 for starting registration of at least one device connected to the first LAN 7 and the second LANs 8A and 8B and a registration end button 2032 for ending registration of at least one device connected to the first LAN 7 and the second LANs 8A and 8B. On the device registration start screen 203, the user who uses the residence 9 touches the registration start button 2031 when starting registration of at least one device connected to the first LAN 7 and the second LANs 8A and 8B. When the registration start button 2031 is touched, a device registration request is sent to the device management server 1.

On the other hand, the device registration start screen 203, the user who uses the residence 9 touches the registration end button 2032 when not starting registration of at least one device connected to the first LAN 7 and the second LANs 8A and 8B. When the registration end button 2032 is touched, the integrated terminal 3 displays a screen immediately before the device registration start screen 203, for example, a menu screen.

Next, referring to FIG. 8, in step S24, the communication unit 13 of the device management server 1 receives the device registration request sent by the integrated terminal 3.

Then, in step S25, the device search unit 102 broadcasts a device search command for searching for at least one device connected to the first LAN 7 and the second LANs 8A and 8B. The communication unit 13 designates broadcast addresses of the first LAN 7 and the second LANs 8A and 8B and sends the device search command to all the devices connected to the first LAN 7 and the second LANs 8A and 8B. Upon receipt of the device search command, the device sends response information including device identification information for identifying a device to the device management server 1. The device identification information includes an IP address of the device.

Subsequently, in step S26, the communication unit 13 receives response information from at least one device connected to the first LAN 7 and the second LANs 8A and 8B. The response information sent from the device reaches the device management server 1 via the repeater. Therefore, the destination of the response information received by the device management server 1 includes the MAC address of the repeater (repeater identification information).

Next, in step S27, the device search unit 102 determines whether one device identification information of at least one device identification information included in the at least one response information received by the communication unit 13 is registered in the device management table.

Here, when it is determined that one device identification information of the at least one device identification information is registered in the device management table (YES in step S27), the processing proceeds to step S32.

On the other hand, when it is determined that one device identification information of the at least one device identification information is not registered in the device management table (NO in step S27), in step S28, the space name specifying unit 103 acquires the repeater identification information from the response information corresponding to one device identification information of the at least one device identification information.

Next, in step S29, the space name specifying unit 103 refers to the repeater management table and specifies the name of the room associated with the acquired repeater identification information.

Then, in step S30, the device name creating unit 104 creates the name of the room specified by the space name specifying unit 103 as the name of the device.

Subsequently, in step S31, the device name registration processing unit 105 registers the one device identification information acquired by the communication unit 13 and the name of the device created by the device name creating unit 104 in the device management table in association with each other.

Next, in step S32, the device search unit 102 determines whether registration of all the device identification information of at least one device identification information included in the at least one response information received by the communication unit 13 has been determined.

Here, when it is determined that registration of all the device identification information has not been determined (NO in step S32), the processing returns to step S27, and the device search unit 102 determines whether another one device identification information of at least one device identification information is registered in the device management table.

On the other hand, when it is determined that registration of all the device identification information has been determined (YES in step S32), in step S33, the communication unit 13 sends a device registration completion notification for notifying that the registration of the device has been completed to the integrated terminal 3.

Next, in step S34, the integrated terminal 3 receives the device registration completion notification sent by the device management server 1.

Then, in step S35, the integrated terminal 3 displays a registration completion notification screen for notifying the user that registration of at least one device identification information and the name of the device has been completed.

Figure 10:
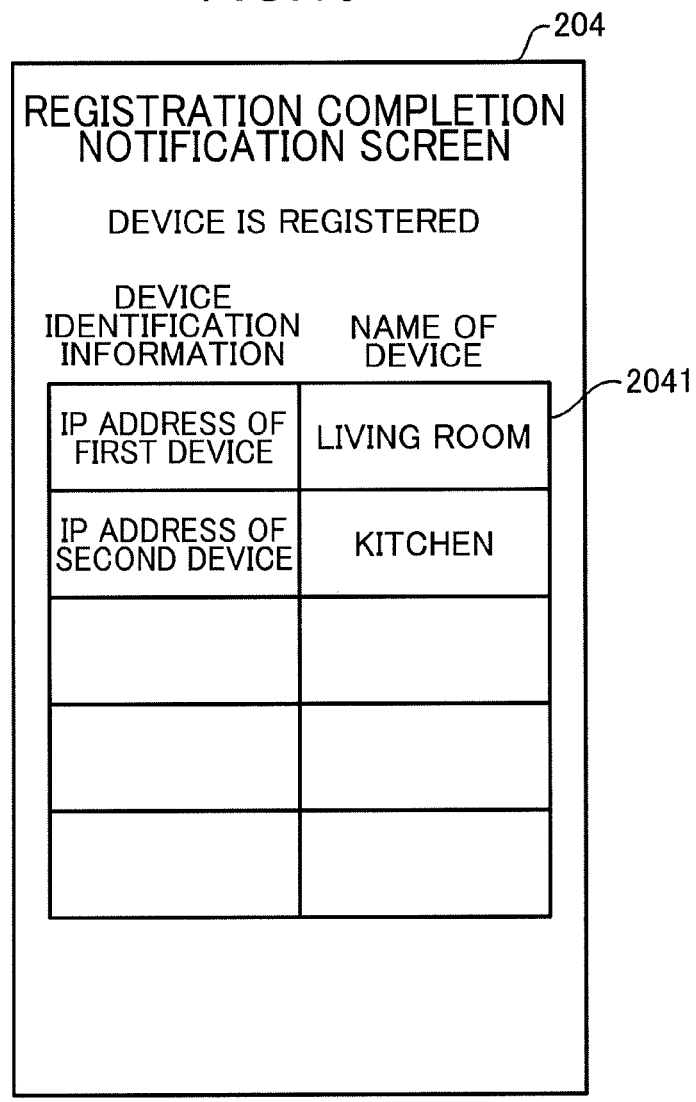
FIG. 10 is a diagram illustrating an example of a registration completion notification screen displayed on the integrated terminal according to the first embodiment.

FIG. 10 is a diagram illustrating an example of the registration completion notification screen displayed on the integrated terminal 3 according to the first embodiment.

The integrated terminal 3 displays a registration completion notification screen 204 illustrated in FIG. 10. The registration completion notification screen 204 includes a device name presentation field 2041 for presenting at least one device identification information and a name of a device corresponding to the at least one device identification information. The device identification information is, for example, an IP address of a device, and the name of the device is a name of a room in which the device is installed.

Here, the first device 5A and the second device 5B are connected to the first LAN 7 and the second LANs 8A and 8B, and the IP address of the first device 5A and the IP address of the second device 5B are displayed in the device name presentation field 2041. As the name of the device corresponding to the IP address of the first device 5A, a living room which is the name of the room in which the first repeater 4A is installed is displayed in the device name presentation field 2041. As the name of the device corresponding to the IP address of the second device 5B, a kitchen which is the name of the room in which the second repeater 4B is installed is displayed in the device name presentation field 2041.

In the first embodiment, the device name creating unit 104 creates the name of the room (space) in which a repeater is installed as the name of the device, but the present disclosure is not limited thereto. The device name creating unit 104 may acquire the type of the device received on a device type input screen for displaying the name of the room (space) specified by the space name specifying unit 103 and receiving input by the user of the type of the device, and create a name of the device based on the acquired type of the device and the name of the room (space).

As described above, since the name of the device is created by using the name of the room in which the repeater installed in the predetermined room is installed, the name of the device that can be identified by the user can be easily created, and complicated creation of the name of the device can be simplified.

Figure 11:
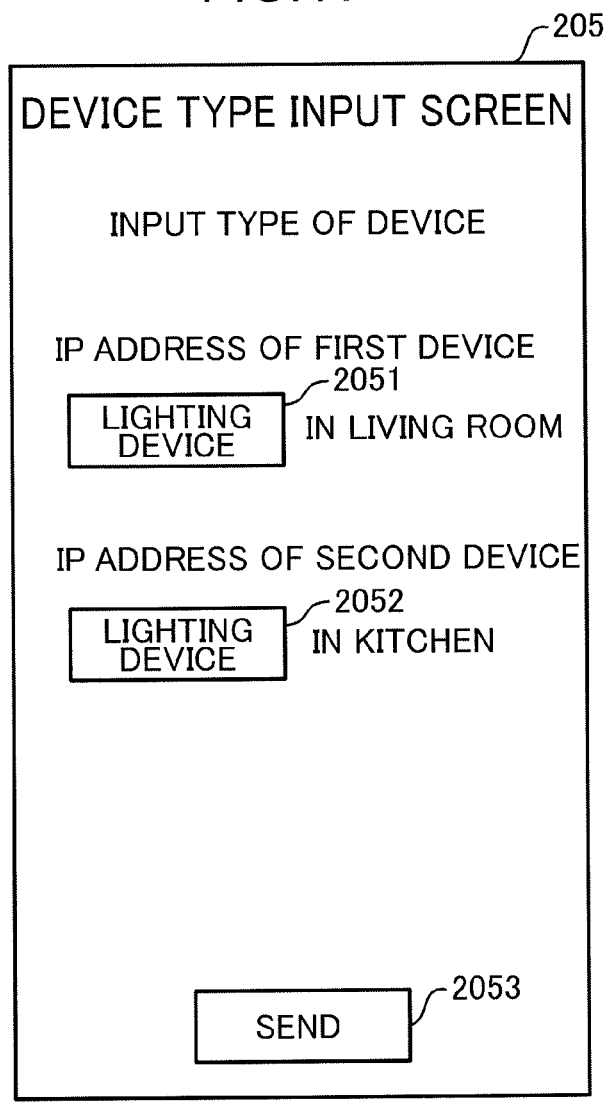
FIG. 11 is a diagram illustrating an example of a device type input screen displayed on an integrated terminal according to a modification of the first embodiment.

FIG. 11 is a diagram illustrating an example of a device type input screen displayed on the integrated terminal 3 according to a modification of the first embodiment.

After the name of the room is specified by the space name specifying unit 103, the device name creating unit 104 sends the device identification information and the name of the room specified by the space name specifying unit 103 to the integrated terminal 3. Upon receipt of the device identification information and the name of the room, the integrated terminal 3 displays the device type input screen illustrated in FIG. 11.

The device type input screen 205 includes at least one device identification information and a name of a room corresponding to the at least one device identification information. The device type input screen 205 includes type input fields 2051 and 2052 for receiving input by the user of a type of a device. On the device type input screen 205, the user who uses the residence 9 inputs a type of a device corresponding to at least one device identification information to the type input fields 2051 and 2052.

Here, the first device 5A and the second device 5B are connected to the first LAN 7 and the second LANs 8A and 8B, and the IP address of the first device 5A and the IP address of the second device 5B are displayed on the device type input screen 205. As the name of the room corresponding to the IP address of the first device 5A, a living room which is the name of the room in which the first repeater 4A is installed is displayed on the device type input screen 205. As the name of the room corresponding to the IP address of the second device 5B, a kitchen which is the name of the room in which the second repeater 4B is installed is displayed on the device type input screen 205.

As the type of device for the IP address of the first device 5A, a lighting device which is the type of the first device 5A is input in the type input field 2051. As the type of device for the IP address of the second device 5B, a lighting device which is the type of the second device 5B is input in the type input field 2052.

The device type input screen 205 includes a send button 2053 for sending a type of a device corresponding to at least one device identification information. When the send button 2053 is touched, at least one device identification information and a type of a device are sent to the device management server 1. The device management server 1 receives the at least one device identification information and the type of device sent by the integrated terminal 3.

The device name creating unit 104 creates a name of the device based on the type of the device and the name of the room received by the communication unit 13. For example, in a case where the name of the room is a living room and the type of the device is a lighting device, the device name creating unit 104 creates a name of a device "lighting device in living room" obtained by combining the name of the room and the type of the device.

In the first embodiment, the device management server 1 performs the repeater registration processing and the device name registration processing. However, the present disclosure is not limited to this. The repeater registration processing and the device name registration processing may be performed by the integrated terminal 3, a mobile terminal such as a smartphone, or a home server installed in the residence 9 and connected to the first LAN 7. In this case, the integrated terminal 3, the mobile terminal, or the home server may include the repeater registration processing unit 101, the device search unit 102, the space name specifying unit 103, the device name creating unit 104, the device name registration processing unit 105, the repeater management table storage 121, and the device management table storage 122.

In the first embodiment, the device management server 1 broadcasts the device search command after receiving the device registration request from the integrated terminal 3, but the present disclosure is not limited thereto. The device management server 1 may periodically broadcast the device search command. For example, the device management server 1 may broadcast the device search command every day or every week. As a result, the name of the newly installed device can be automatically registered.

Second Embodiment

In the first embodiment, the name of the room in which the repeater is installed is registered as the name of the device. In this case, in a case where a plurality of devices are installed in one room, the names of the plurality of devices are all the same, and it is difficult to identify the plurality of devices. Therefore, in a second embodiment, the type of the device is further acquired, and the name of the device is created by combining the specified name of the space and the acquired type of the device.

Figure 12:
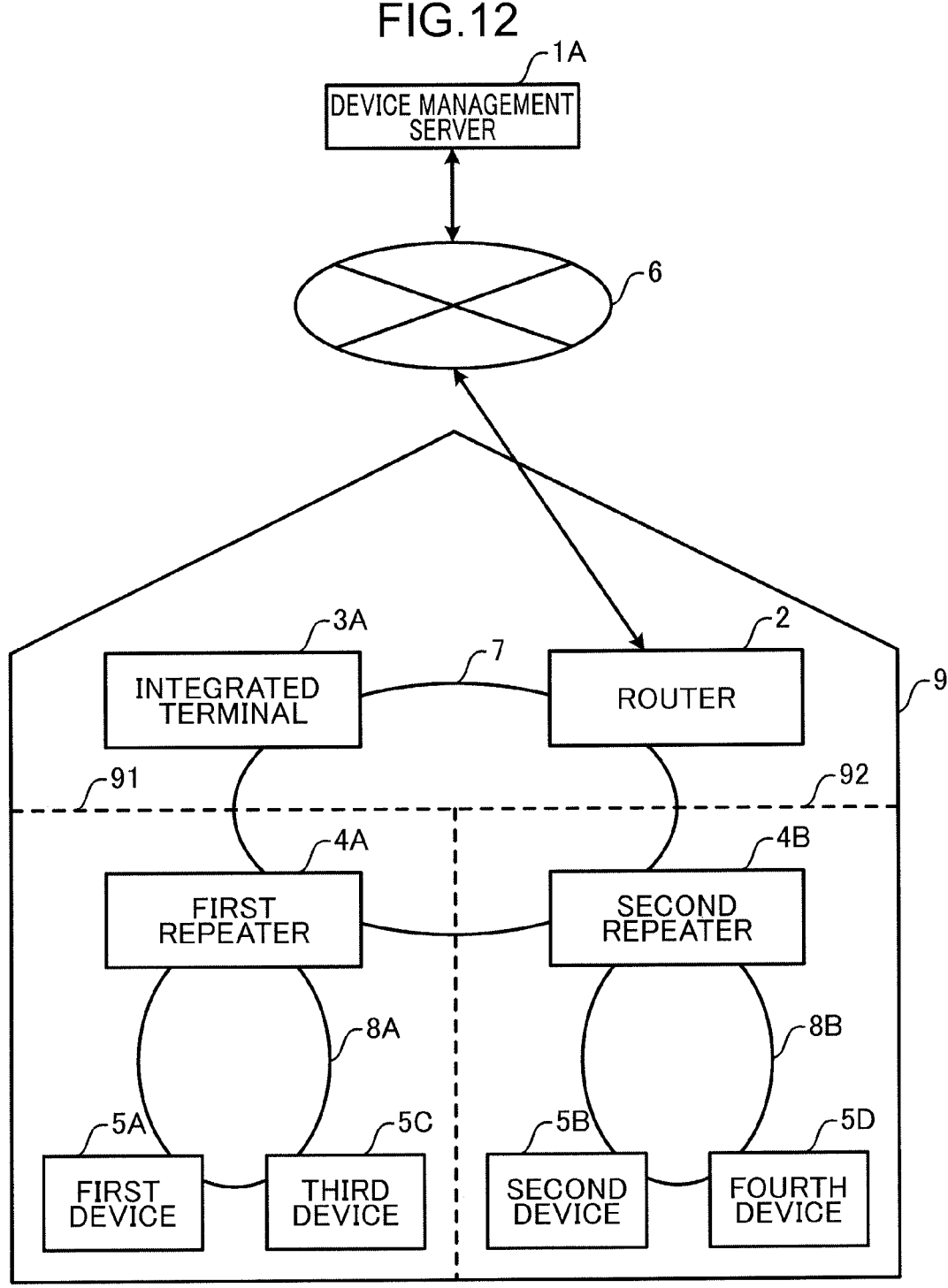
FIG. 12 is a diagram illustrating an example of a configuration of a device management system according to a second embodiment of the present disclosure.

FIG. 12 is a diagram illustrating an example of a configuration of a device management system according to the second embodiment of the present disclosure.

The device management system illustrated in FIG. 12 includes a device management server 1A, a router 2, an integrated terminal 3A, a first repeater 4A, a second repeater 4B, a first device 5A, a second device 5B, a third device 5C, and a fourth device 5D. In the second embodiment, the same components as those in the first embodiment are denoted by the same reference signs, and description thereof will be omitted.

The third device 5C and the fourth device 5D may be, for example, housing equipment such as a lighting device, a device for opening and closing a shutter, or a hot water supply installed in the residence 9, and may be, for example, a home appliance such as a television, a refrigerator, a washing machine, or a microwave oven installed in the residence 9. The first device 5A and the third device 5C are installed in the first room 91. The second device 5B and the fourth device 5D are installed in the second room 92 different from the first room 91. The third device 5C is communicably connected to the device management server 1A via the first repeater 4A. The fourth device 5D is communicably connected to the device management server 1A via the second repeater 4B.

Figure 13:
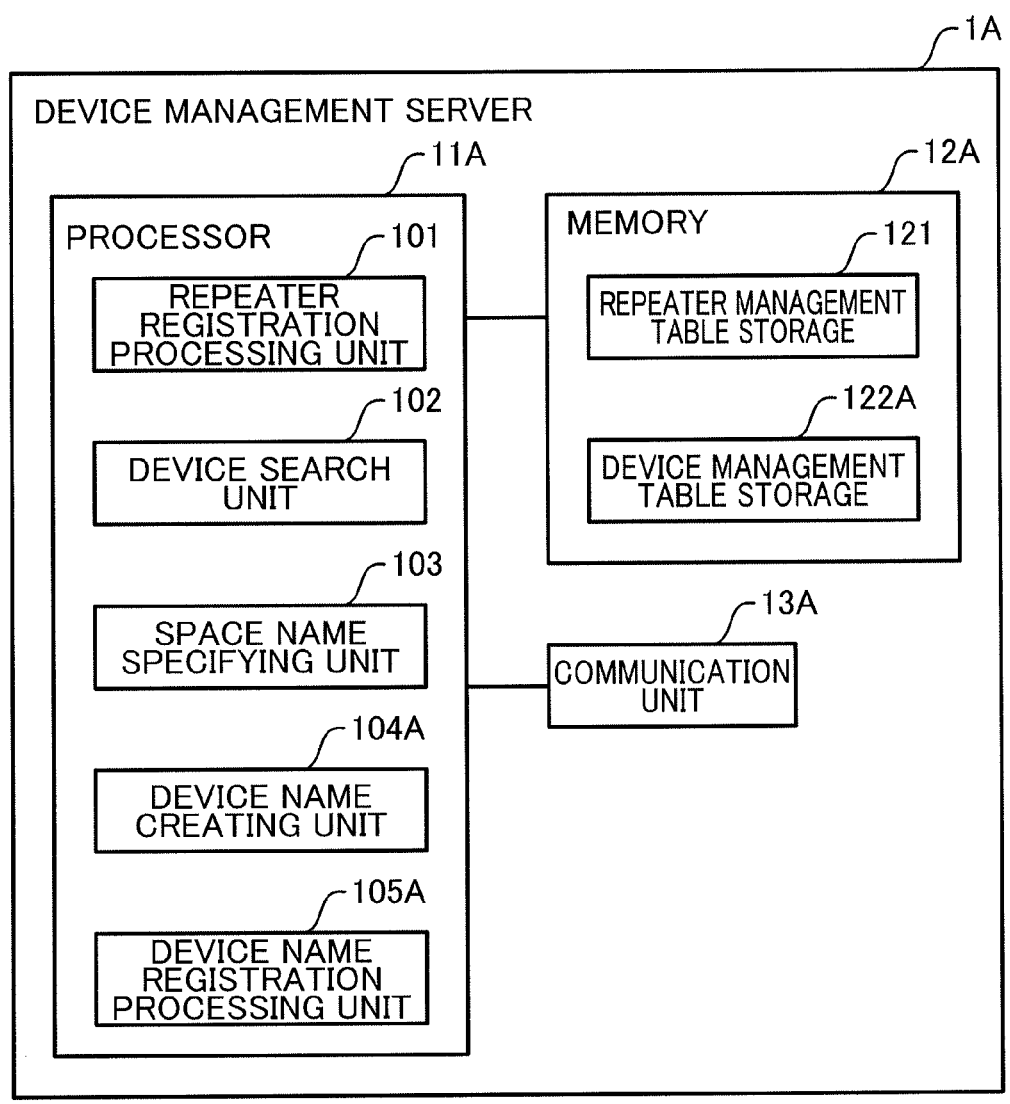
FIG. 13 is a diagram illustrating an example of a configuration of a device management server according to the second embodiment of the present disclosure.

FIG. 13 is a diagram illustrating an example of a configuration of the device management server 1A according to the second embodiment of the present disclosure.

The device management server 1A illustrated in FIG. 13 includes a processor 11A, a memory 12A, and a communication unit 13A.

The processor 11A is, for example, a CPU. The processor 11A implements a repeater registration processing unit 101, a device search unit 102, a space name specifying unit 103, a device name creating unit 104A, and a device name registration processing unit 105A.

The memory 12A is a storage device capable of storing various types of information, such as a RAM, an HDD, an SSD, or a flash memory. The memory 12A implements a repeater management table storage 121 and a device management table storage 122A.

The communication unit 13A acquires the repeater identification information, the device identification information, and the type of the device from the device. That is, the communication unit 13A receives the response information including the repeater identification information, the device identification information, and the type of the device. The type of the device is, for example, a device object defined in ECHONET Lite (registered trademark) standard. The device stores the type of the device in advance. Upon receipt of the device search command, the device sends response information including the device identification information and the type of the device to the device management server 1A.

The device name creating unit 104A creates a name of the device by combining the name of the room (space) specified by the space name specifying unit 103 and the type of the device acquired by the communication unit 13A. For example, in a case where the name of the room is a living room and the type of the device is a television, the device name creating unit 104A may create a name of a device in which the name of the room and the type of the device are connected, such as "living room television". Alternatively, the device name creating unit 104A may create a name of a device in which a particle is inserted between the name of the room and the type of device, such as "television in living room".

The device name registration processing unit 105A registers the device identification information (second identification information) acquired by the communication unit 13A, the repeater identification information (first identification information) acquired by the communication unit 13A, and the name of the device created by the device name creating unit 104A in a device management table (second table) in association with each other.

The device management table storage 122A stores the device management table (second table) in which the device identification information (second identification information) for identifying the device, the repeater identification information (first identification information) for identifying the repeater, and the name of the device are associated with each other.

FIG. 14 is a diagram illustrating an example of the device management table stored in the device management table storage 122A according to the second embodiment.

The device management table associates at least one device identification information, at least one repeater identification information, and a name of at least one device with each other. The device management table illustrated in FIG. 14 associates, for example, the IP address of the first device 5A, the MAC address of the first repeater 4A, and the lighting device in the living room with each other, and associates the IP address of the third device 5C, the MAC address of the first repeater 4A, and the television in the living room with each other. The device management table associates, for example, the IP address of the second device 5B, the MAC address of the second repeater 4B, and the lighting device in the kitchen with each other, and associates the IP address of the fourth device 5D, the MAC address of the second repeater 4B, and the refrigerator in the kitchen with each other.

The IP address of the first device 5A is device identification information for identifying the first device 5A, and the IP address of the second device 5B is device identification information for identifying the second device 5B. The IP address of the third device 5C is device identification information for identifying the third device 5C, and the IP address of the fourth device 5D is device identification information for identifying the fourth device 5D. The lighting device in the living room is the name of the first device 5A, the lighting device in the kitchen is the name of the second device 5B, the television in the living room is the name of the third device 5C, and the refrigerator in the kitchen is the name of the fourth device 5D.

In the second embodiment, the name of the device is created by combining the name of the room in which the repeater is installed and the type of the device.

The device management table according to the second embodiment associates the device identification information, the repeater identification information, and the name of the device with each other. In a case where the device registered in the device management table is moved to another room, the device management server 1A acquires repeater identification information different from the repeater identification information registered in the device management table. Therefore, when the acquired repeater identification information is different from the repeater identification information associated with the device identification information, the device management server 1A specifies the name of the room from the new repeater identification information, and creates a name of the device by combining the specified name of the room and the type of the device. Then, the device management server 1A registers the device identification information, the new repeater identification information, and the new name of the device in the device management table in association with each other. As a result, when the device is moved to another room, it is still possible to create a new name of the device by using the name of the another room.

In the first embodiment, the device management table storage 122 may also store the device management table in which the device identification information for identifying the device, the repeater identification information for identifying the repeater, and the name of the device are associated with each other.

The following is a description of device name registration processing by the device management system according to the second embodiment of the present disclosure.

Figure 15:
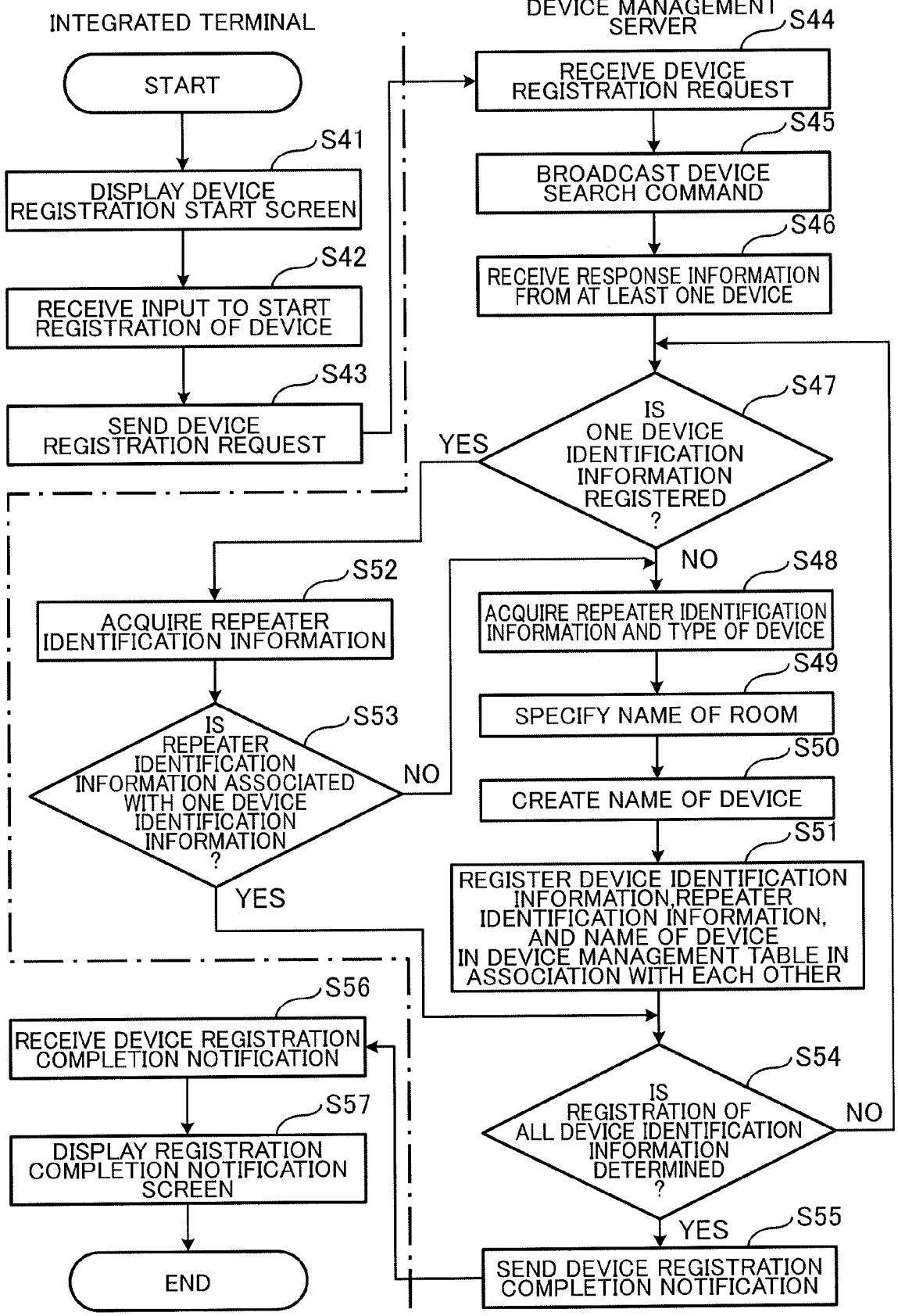
FIG. 15 is a flowchart for describing device name registration processing by the device management system according to the second embodiment of the present disclosure.

FIG. 15 is a flowchart for describing the device name registration processing by the device management system according to the second embodiment of the present disclosure.

Since processing of steps S41 to S44 is the same as the processing of steps S21 to S24 illustrated in FIG. 8, description thereof will be omitted.

Then, in step S45, the device search unit 102 broadcasts a device search command for searching for at least one device connected to the first LAN 7 and the second LANs 8A and 8B. The communication unit 13A designates broadcast addresses of the first LAN 7 and the second LANs 8A and 8B and sends the device search command to all the devices connected to the first LAN 7 and the second LANs 8A and 8B. Upon receipt of the device search command, the device sends response information including the device identification information for identifying the device and the type of the device to the device management server 1A.

Subsequently, in step S46, the communication unit 13A receives response information from at least one device connected to the first LAN 7 and the second LANs 8A and 8B. The response information sent from the device reaches the device management server 1A via the repeater. Therefore, the destination of the response information received by the device management server 1A includes the MAC address of the repeater (repeater identification information).

Next, in step S47, the device search unit 102 determines whether one device identification information of at least one device identification information included in the at least one response information received by the communication unit 13A is registered in the device management table.

Here, when it is determined that one device identification information of the at least one device identification information is not registered in the device management table (NO in step S47), in step S48, the space name specifying unit 103 acquires the repeater identification information and the type of the device from the response information corresponding to one device identification information of the at least one device identification information.

Next, in step S49, the space name specifying unit 103 refers to the repeater management table and specifies the name of the room associated with the acquired repeater identification information.

Then, in step S50, the device name creating unit 104A creates a name of the device by combining the name of the room specified by the space name specifying unit 103 and the acquired type of the device.

Subsequently, in step S51, the device name registration processing unit 105A registers the one device identification information acquired by the communication unit 13A, the repeater identification information acquired with the one device identification information, and the name of the device created by the device name creating unit 104A in the device management table in association with each other.

On the other hand, when it is determined that one device identification information of the at least one device identification information is registered in the device management table (YES in step S47), in step S52, the device search unit 102 acquires repeater identification information from the response information corresponding to the registered one device identification information.

Next, in step S53, the device search unit 102 determines whether the acquired repeater identification information is registered in the device management table in association with the one device identification information.

Here, when it is determined that the acquired repeater identification information is registered in the device management table in association with the one device identification information (YES in step S53), the processing proceeds to step S54.

On the other hand, when it is determined that the acquired repeater identification information is not registered in the device management table in association with the one device identification information (NO in step S53), the processing proceeds to step S48.

Since processing of steps S54 to S57 is the same as the processing of steps S32 to S35 illustrated in FIG. 8, description thereof will be omitted.

FIG. 16 is a diagram illustrating an example of a registration completion notification screen displayed on the integrated terminal 3A according to the second embodiment.

The integrated terminal 3A displays a registration completion notification screen 206 illustrated in FIG. 16. The registration completion notification screen 206 includes a device name presentation field 2061 for presenting at least one device identification information and a name of a device corresponding to the at least one device identification information. The device identification information is, for example, an IP address of a device, and the name of the device is a combination of a name of a room in which the device is installed and a type of a device.

Here, the first device 5A, the second device 5B, the third device 5C, and the fourth device 5D are connected to the first LAN 7 and the second LANs 8A and 8B, and the IP address of the first device 5A, the IP address of the third device 5C, the IP address of the second device 5B, and the IP address of the fourth device 5D are displayed in the device name presentation field 2061.

As the name of the device corresponding to the IP address of the first device 5A, a combination of a living room which is the name of the room in which the first repeater 4A is installed and a lighting device which is the type of the first device 5A is displayed in the device name presentation field 2061. As the name of the device corresponding to the IP address of the third device 5C, a combination of a living room which is the name of the room in which the first repeater 4A is installed and a television which is the type of the third device 5C is displayed in the device name presentation field 2061. As the name of the device corresponding to the IP address of the second device 5B, a combination of a kitchen which is the name of the room in which the second repeater 4B is installed and a lighting device which is the type of the second device 5B is displayed in the device name presentation field 2061. As the name of the device corresponding to the IP address of the fourth device 5D, a combination of a kitchen which is the name of the room in which the second repeater 4B is installed and a refrigerator which is the type of the fourth device 5D is displayed in the device name presentation field 2061.

As described above, since a name of a device is created by combining the specified name of the room and the acquired type of the device, the user can easily identify the device from a combination of the name of the room and the type of the device.

Third Embodiment

In the first embodiment, the name of the room (space) in which a repeater used for connecting a device to a network is installed is registered as the name of the device. On the other hand, in a third embodiment, the name of the room (space) in which a position reference device (signal transmitter) that transmits a wireless signal is installed is registered as the name of the device.

Figure 17:
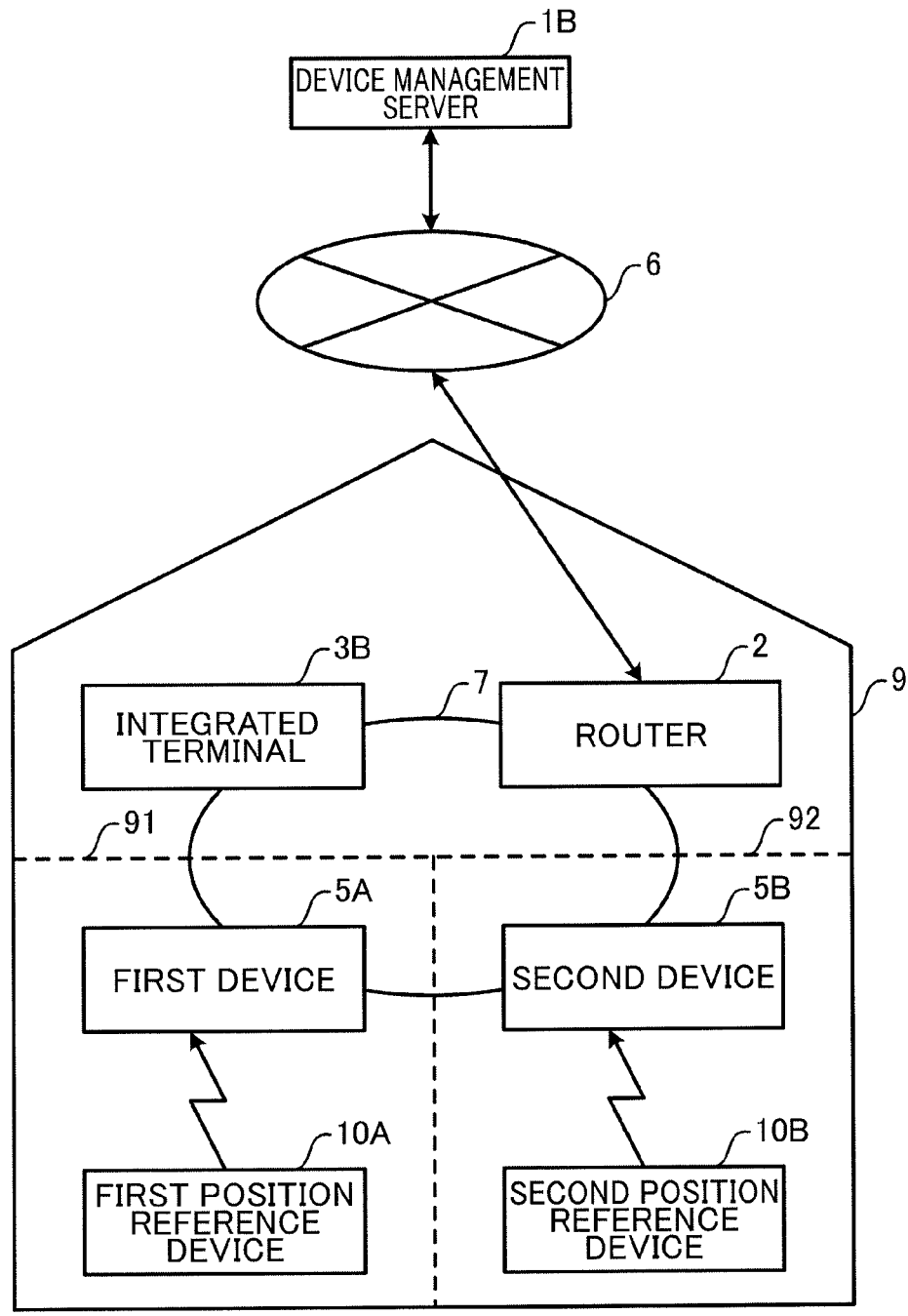
FIG. 17 is a diagram illustrating an example of a configuration of a device management system according to a third embodiment of the present disclosure.

FIG. 17 is a diagram illustrating an example of a configuration of a device management system according to the third embodiment of the present disclosure. The device management system illustrated in FIG. 17 includes a device management server 1B, a router 2, an integrated terminal 3B, a first device 5A, a second device 5B, a first position reference device 10A, and a second position reference device 10B. In the third embodiment, the same components as those in the first embodiment are denoted by the same reference signs, and description thereof will be omitted.

The first position reference device 10A is installed in a predetermined room (space) among the plurality of rooms (spaces) included in the residence 9 (indoor environment). The first position reference device 10A is installed, for example, on the ceiling of the first room 91 in the residence 9. The first position reference device 10A is an example of a signal transmitter that transmits a wireless signal. The first position reference device 10A is, for example, a Bluetooth (registered trademark) low energy (BLE) beacon. The wireless signal includes position reference device identification information (first identification information) for identifying the first position reference device 10A. The position reference device identification information is, for example, a universally unique identifier (UUID).

The second position reference device 10B is installed in a predetermined room (space) among the plurality of rooms (spaces) included in the residence 9 (indoor environment). The second position reference device 10B is installed, for example, on the ceiling of the second room 92 in the residence 9. The second position reference device 10B is an example of a signal transmitter that transmits a wireless signal. The second position reference device 10B is, for example, a BLE beacon. The wireless signal includes position reference device identification information (first identification information) for identifying the second position reference device 10B.

The first position reference device 10A and the second position reference device 10B periodically transmit wireless signals. The first position reference device 10A and the second position reference device 10B transmit wireless signals, for example, every one second.

The first position reference device 10A and the second position reference device 10B are examples of a position specifying device.

The first device 5A is communicably connected to the device management server 1B via the first LAN 7. The second device 5B is communicably connected to the device management server 1B via the first LAN 7. The first LAN 7 includes the router 2, the integrated terminal 3B, the first device 5A, and the second device 5B.

The first device 5A receives the wireless signal transmitted by the first position reference device 10A, and sends the position reference device identification information (first identification information) included in the received wireless signal to the device management server 1B.

The second device 5B receives the wireless signal transmitted by the second position reference device 10B, and sends the position reference device identification information (first identification information) included in the received wireless signal to the device management server 1B.

Figure 18:
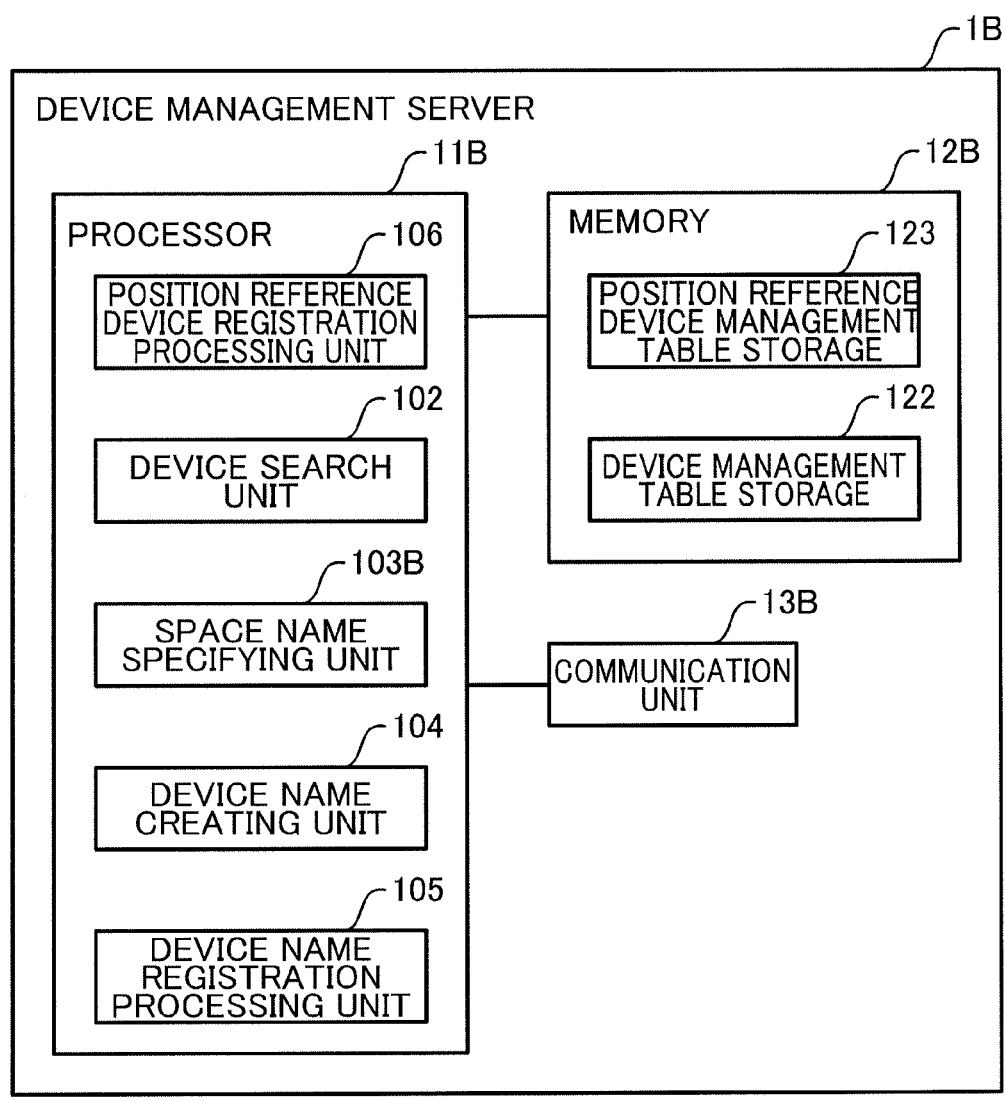
FIG. 18 is a diagram illustrating an example of a configuration of a device management server according to the third embodiment of the present disclosure.

FIG. 18 is a diagram illustrating an example of a configuration of the device management server 1B according to the third embodiment of the present disclosure.

The device management server 1B illustrated in FIG. 18 includes a processor 11B, a memory 12B, and a communication unit 13B.

The processor 11B is, for example, a CPU. The processor 11B implements a device search unit 102, a space name specifying unit 103B, a device name creating unit 104, a device name registration processing unit 105, and a position reference device registration processing unit 106.

The memory 12B is a storage device capable of storing various types of information, such as a RAM, an HDD, an SSD, or a flash memory. The memory 12B implements a device management table storage 122 and a position reference device management table storage 123.

The communication unit 13B sends various information to the integrated terminal 3B, the first device 5A, and the second device 5B, and receives various information from the integrated terminal 3B, the first device 5A, and the second device 5B.

The position reference device registration processing unit 106 registers, in the position reference device management table (first table), at least one position reference device identification information for identifying at least one position reference device and a name of a room (space) in the residence 9 where the at least one position reference device is installed in association with each other.

Here, the integrated terminal 3B receives a wireless signal transmitted from at least one position reference device installed in each room in the residence 9. At this time, the wireless signal includes position reference device identification information for identifying the position reference device. The position reference device identification information is, for example, the UUID of the position reference device.

The integrated terminal 3B displays at least one position reference device identification information included in the received at least one wireless signal, and receives input of position information for the at least one position reference device identification information. The position information includes the name of the room (space) in which the position reference device is installed. The integrated terminal 3B sends the at least one position reference device identification information and the position information to the device management server 1B. The communication unit 13B of the device management server 1B receives the at least one position reference device identification information and the position information sent by the integrated terminal 3B. The position reference device registration processing unit 106 registers, in the position reference device management table, at least one position reference device identification information for identifying at least one position reference device and a name of a room (space) in the residence 9 where the position reference device is installed in association with each other.

The position reference device management table storage 123 stores the position reference device management table (first table) in which position reference device identification information for identifying a position reference device (first identification information) and a name of a room (space) in which the position reference device is installed are associated with each other in advance.

FIG. 19 is a diagram illustrating an example of the position reference device management table stored in the position reference device management table storage 123 according to the third embodiment.

The position reference device management table associates at least one position reference device identification information with a name of a room in which the position reference device is installed. The position reference device management table illustrated in FIG. 19 associates, for example, a UUID of the first position reference device 10A with the living room, and associates a UUID of the second position reference device 10B with the kitchen. The UUID of the first position reference device 10A is position reference device identification information for identifying the first position reference device 10A, and the UUID of the second position reference device 10B is position reference device identification information for identifying the second position reference device 10B. The living room is a name of a room in which the first position reference device 10A is installed, and the kitchen is a name of a room in which the second position reference device 10B is installed.

The device search unit 102 broadcasts a device search command for searching for a device connected to the first LAN 7. Upon receipt of the device search command, the device receives a wireless signal transmitted by a position reference device and acquires position reference device identification information from the received wireless signal. Then, the device sends response information to the device management server 1B. At this time, the response information includes position reference device identification information for identifying a position reference device and device identification information for identifying a device. The position reference device identification information is the UUID of the position reference device that has transmitted the wireless signal. The device identification information includes an IP address of the device of a sender. The communication unit 13B acquires, from a device, position reference device identification information (first identification information) for identifying a position reference device (position specifying device) installed in a predetermined room (space) among a plurality of rooms (spaces) included in the indoor environment, and device identification information (second identification information) for identifying a device installed in the indoor environment. That is, the communication unit 13B receives the response information including the position reference device identification information and the device identification information.

The space name specifying unit 103B refers to the position reference device management table (first table) in which the position reference device identification information (first identification information) for identifying a position reference device (position specifying device) and a name of a room (space) in which the position reference device (position specifying device) is installed are associated in advance, and specifies the name of the room (space) associated with the acquired position reference device identification information (first identification information).

The position reference devices (the first position reference device 10A and the second position reference device 10B) are installed in each of two or more rooms (spaces) among the plurality of rooms (spaces). The space name specifying unit 103B specifies a name of a room (space) associated with the position reference device identification information (first identification information) for identifying a position reference device installed in a room (space) in which a device is installed, among two or more position reference devices installed in the two or more rooms (spaces).

In the third embodiment, the name of the room in which the first position reference device 10A is installed is created as the name of the first device 5A, and the name of the room in which the second position reference device 10B is installed is created as the name of the second device 5B.

The following is a description of position reference device registration processing by the device management system according to the third embodiment of the present disclosure.

Figure 20:
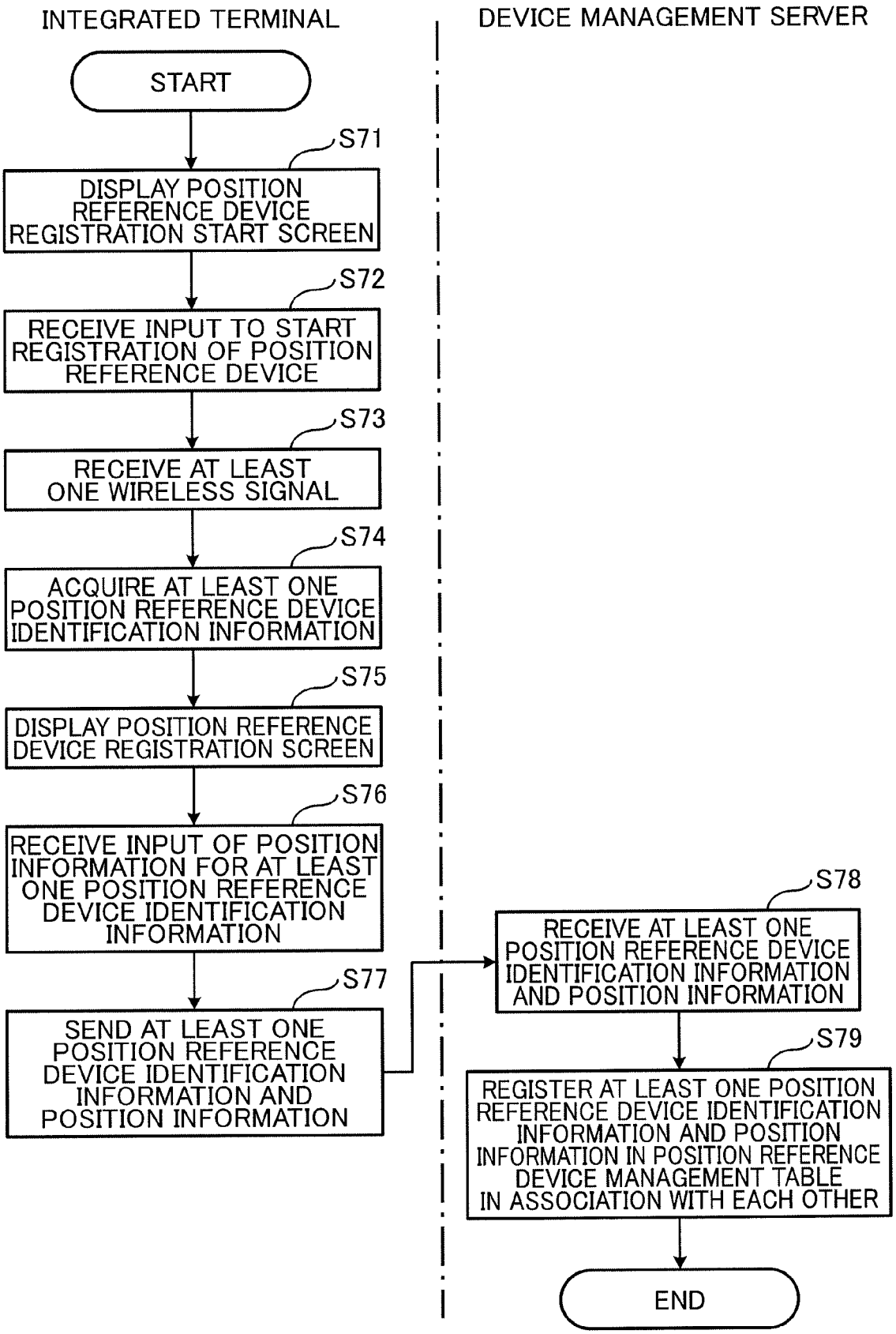
FIG. 20 is a flowchart for describing position reference device registration processing by the device management system according to the third embodiment of the present disclosure.

FIG. 20 is a flowchart for describing the position reference device registration processing by the device management system according to the third embodiment of the present disclosure.

First, in step S71, the integrated terminal 3B displays a position reference device registration start screen for starting registration of at least one position reference device identification information for identifying at least one position reference device and the name of the room in which the position reference device is installed in the position reference device management table.

Next, in step S72, the integrated terminal 3B receives input for starting registration of at least one position reference device installed in at least one room in the residence 9.

Figure 21:
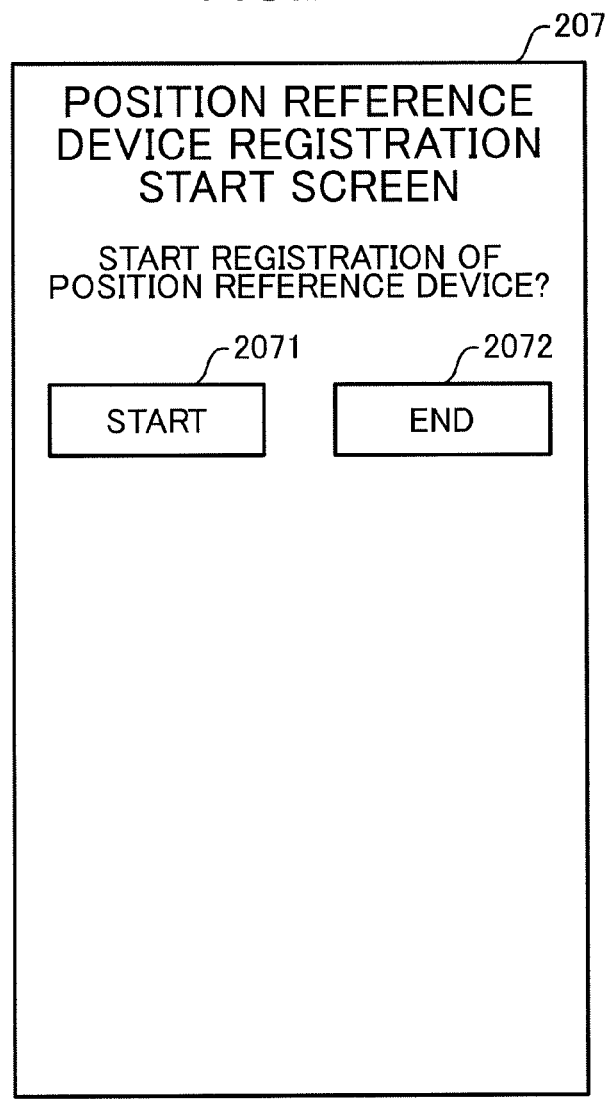
FIG. 21 is a diagram illustrating an example of a position reference device registration start screen displayed on the integrated terminal according to the third embodiment.

FIG. 21 is a diagram illustrating an example of the position reference device registration start screen displayed on the integrated terminal 3B according to the third embodiment.

The integrated terminal 3B displays a position reference device registration start screen 207 illustrated in FIG. 21. The position reference device registration start screen 207 includes a registration start button 2071 for starting registration of at least one position reference device installed in at least one room in the residence 9 and a registration end button 2072 for ending registration of at least one position reference device installed in at least one room in the residence 9. On the position reference device registration start screen 207, the user who uses the residence 9 touches the registration start button 2071 when starting registration of at least one position reference device installed in at least one room in the residence 9. When the registration start button 2071 is touched, reception of at least one wireless signal transmitted from at least one position reference device installed in each room in the residence 9 is started.

On the other hand, on the position reference device registration start screen 207, the user who uses the residence 9 touches the registration end button 2072 when not starting registration of at least one position reference device installed in at least one room in the residence 9. When the registration end button 2072 is touched, the integrated terminal 3B displays a screen immediately before the position reference device registration start screen 207, for example, a menu screen.

Next, referring to FIG. 20, in step S73, the integrated terminal 3B receives at least one wireless signal transmitted from at least one position reference device installed in each room in the residence 9. The position reference device periodically transmits a wireless signal including position reference device identification information for identifying the position reference device. The position reference device identification information is, for example, the UUID of the position reference device. The position reference device identification information may be a MAC address, an IP address, or a serial number of the position reference device, and may be any information that can uniquely identify the position reference device.

Next, in step S74, the integrated terminal 3B acquires at least one position reference device identification information from the received at least one wireless signal.

Then, in step S75, the integrated terminal 3B displays a position reference device registration screen for displaying the acquired at least one position reference device identification information and receiving input of position information for the at least one position reference device identification information.

In step S76, the integrated terminal 3B receives input of the position information for the at least one position reference device identification information.

In step S77, the integrated terminal 3B sends at least one position reference device identification information and position information input by the user to the device management server 1B.

Figure 22:
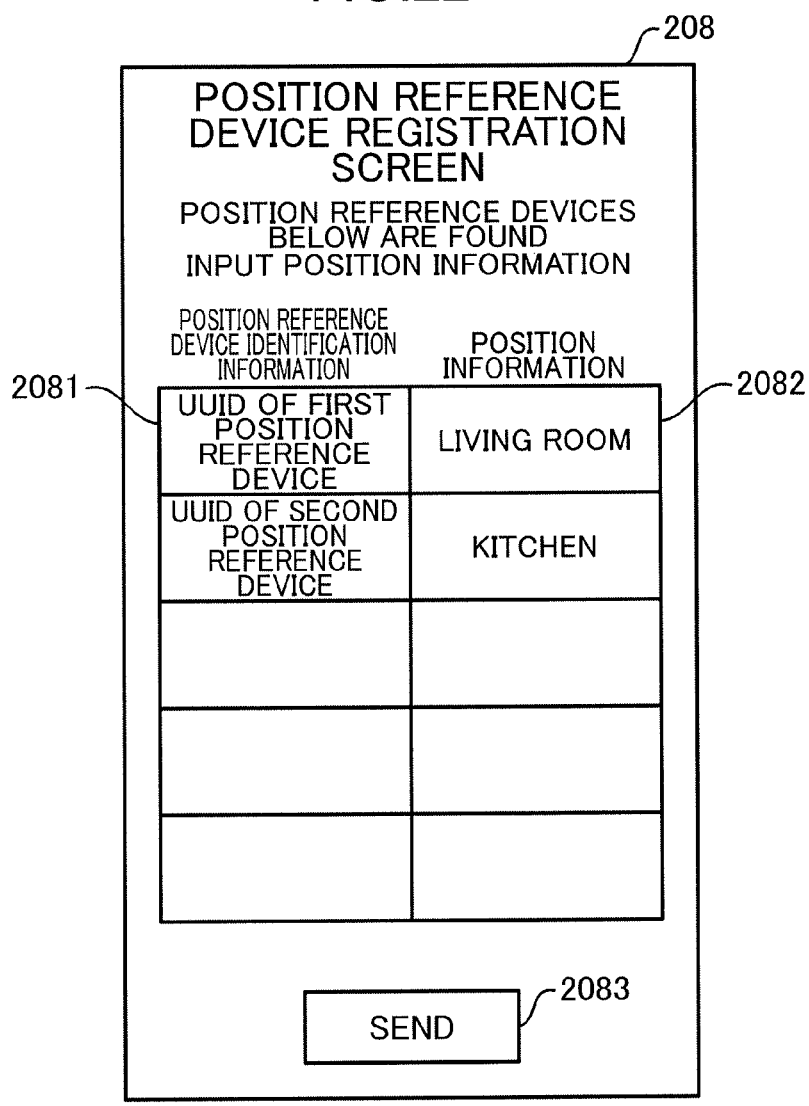
FIG. 22 is a diagram illustrating an example of a position reference device registration screen displayed on the integrated terminal according to the third embodiment.

FIG. 22 is a diagram illustrating an example of the position reference device registration screen displayed on the integrated terminal 3B according to the third embodiment.

The integrated terminal 3B displays a position reference device registration screen 208 illustrated in FIG. 22. The position reference device registration screen 208 includes an identification information presentation field 2081 for presenting at least one position reference device identification information and a position information input field 2082 for inputting position information corresponding to the at least one position reference device identification information. On the position reference device registration screen 208, the user who uses the residence 9 inputs position information corresponding to at least one position reference device identification information to the position information input field 2082. The position reference device identification information is, for example, a UUID of the position reference device, and the position information is, for example, a name of a room in which the position reference device is installed.

Here, the first position reference device 10A and the second position reference device 10B are installed in the residence 9, and the UUID of the first position reference device 10A and the UUID of the second position reference device 10B are displayed in the identification information presentation field 2081. As the position information for the UUID of the first position reference device 10A, the living room which is the name of the room in which the first position reference device 10A is installed is input in the position information input field 2082. As the position information for the UUID of the second position reference device 10B, the kitchen which is the name of the room in which the second position reference device 10B is installed is input in the position information input field 2082.

The position reference device registration screen 208 includes a send button 2083 for sending at least one position reference device identification information and each input position information. When the send button 2083 is touched, at least one position reference device identification information and position information are sent to the device management server 1B.

Next, referring to FIG. 20, in step S78, the communication unit 13B of the device management server 1B receives the at least one position reference device identification information and the position information sent by the integrated terminal 3B.

Then, in step S79, the position reference device registration processing unit 106 registers the at least one position reference device identification information and the position information (name of room) in the position reference device management table in association with each other.

In the third embodiment, the integrated terminal 3B receives the wireless signal in a state where the plurality of position reference devices are installed in the rooms, but the present disclosure is not limited thereto. When a distance between the integrated terminal 3B and the position reference device is large, there is a possibility that the integrated terminal 3B cannot receive the wireless signal transmitted from the position reference device. Therefore, the integrated terminal 3B may receive the wireless signal in a state where a plurality of position reference devices installed in the rooms of the residence 9 are disposed near the integrated terminal 3B. The plurality of position reference devices may be installed in the rooms after the registration processing of the plurality of position reference devices is performed.

The following is a description of device name registration processing by the device management system according to the third embodiment of the present disclosure.

Figure 23:
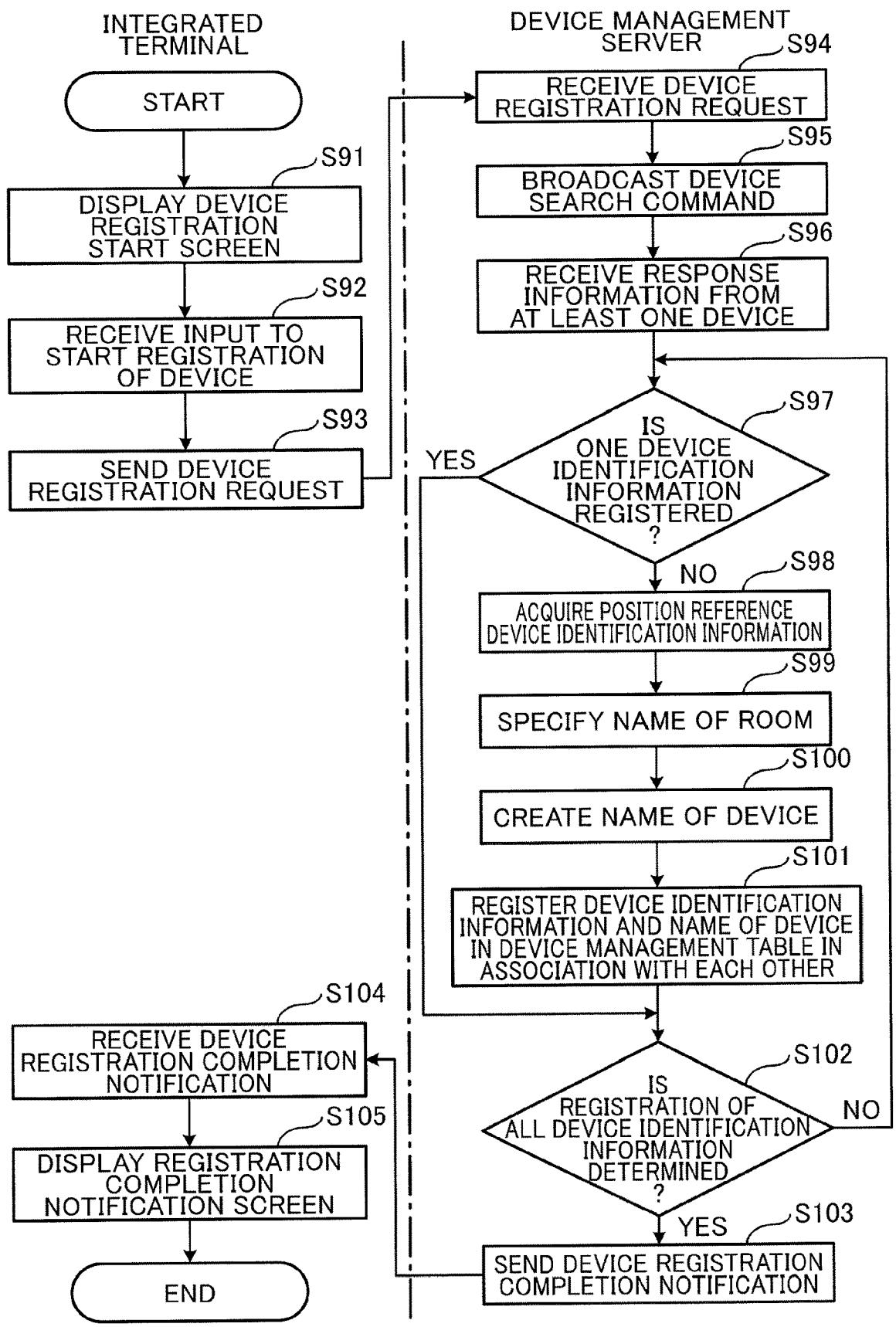
FIG. 23 is a flowchart for describing device name registration processing by the device management system according to the third embodiment of the present disclosure.

FIG. 23 is a flowchart for describing the device name registration processing by the device management system according to the third embodiment of the present disclosure.

Since processing of steps S91 to S94 is the same as the processing of steps S21 to S24 illustrated in FIG. 8, description thereof will be omitted.

Then, in step S95, the device search unit 102 broadcasts a device search command for searching for at least one device connected to the first LAN 7. The communication unit 13B designates a broadcast address of the first LAN 7 and sends the device search command to all the devices connected to the first LAN 7. Upon receipt of the device search command, the device receives a wireless signal transmitted by a position reference device and acquires position reference device identification information from the received wireless signal. Upon receipt of a plurality of wireless signals, the device acquires the position reference device identification information from the wireless signal having the highest received radio wave intensity. The device sends, to the device management server 1B, response information including position reference device identification information for identifying a position reference device and device identification information for identifying a device. The position reference device identification information is the UUID of the position reference device included in the wireless signal having the highest received radio wave intensity.

Subsequently, in step S96, the communication unit 13B receives response information from at least one device connected to the first LAN 7.

Next, in step S97, the device search unit 102 determines whether one device identification information of at least one device identification information included in the at least one response information received by the communication unit 13B is registered in the device management table.

Here, when it is determined that one device identification information of the at least one device identification information is registered in the device management table (YES in step S97), the processing proceeds to step S102.

On the other hand, when it is determined that one device identification information of the at least one device identification information is not registered in the device management table (NO in step S97), in step S98, the space name specifying unit 103B acquires the position reference device identification information from the response information corresponding to one device identification information of the at least one device identification information.

Next, in step S99, the space name specifying unit 103B refers to the position reference device management table and specifies the name of the room associated with the acquired position reference device identification information.

Since processing of steps S100 to S105 is the same as the processing of steps S30 to S35 illustrated in FIG. 8, description thereof will be omitted.

As described above, since the device receives the wireless signal transmitted by the position reference device installed in the same space as the device and sends the position reference device identification information included in the received wireless signal to the device management server 1B, the name of the device can be created by using the name of the room in which the position reference device is installed.

In the third embodiment, the device name creating unit 104 may also acquire the type of the device received on a device type input screen for displaying the name of the room (space) specified by the space name specifying unit 103B and receiving input by the user of the type of the device, and create a name of the device based on the acquired type of the device and the name of the room (space).

In the third embodiment, as in the second embodiment, the type of the device may be further acquired, and the name of the device may be created by combining the specified name of the space and the acquired type of the device.

Fourth Embodiment

In a case where a family is living at the residence 9, the name of the room may change over time. For example, even when an initial name of the room is a western-style room, the room may be referred to as a room of XX (XX is a name of one of the family members) over time. In this case, the name of the device is preferably changed from "western-style room" to "room of XX".

Therefore, in a fourth embodiment, audio information in the indoor environment is acquired, and a name of a space included in the audio information is extracted. Then, in a case where the name of the extracted space does not exist among the names of the spaces associated with the repeater management table, the name of the extracted space is presented to the user, and a change of the name of the space associated with the repeater management table by the user is received.

Figure 24:
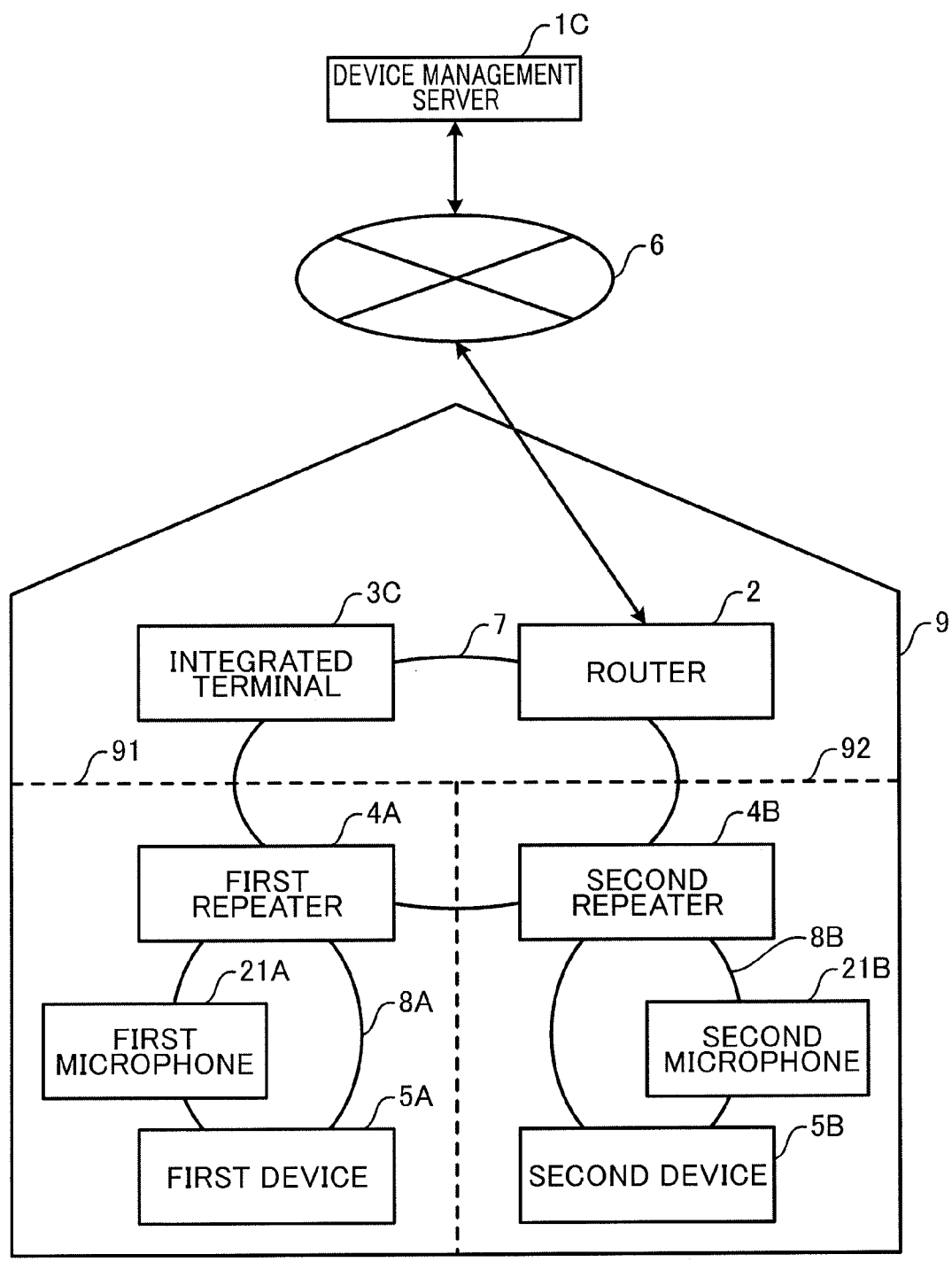
FIG. 24 is a diagram illustrating an example of a configuration of a device management system according to a fourth embodiment of the present disclosure.

FIG. 24 is a diagram illustrating an example of a configuration of a device management system according to the fourth embodiment of the present disclosure.

The device management system illustrated in FIG. 24 includes a device management server 1C, a router 2, an integrated terminal 3C, a first repeater 4A, a second repeater 4B, a first device 5A, a second device 5B, a first microphone 21A, and a second microphone 21B. In the fourth embodiment, the same components as those in the first embodiment are denoted by the same reference signs, and description thereof will be omitted.

A microphone is installed in each room in the residence 9.

The first microphone 21A is installed in the first room 91 and collects audio information in the first room 91. The first microphone 21A is installed, for example, on the ceiling of the first room 91. The first microphone 21A is communicably connected to the device management server 1C via the first repeater 4A. The first microphone 21A sends the collected audio information to the device management server 1C.

The second microphone 21B is installed in the second room 92 and collects audio information in the second room 92. The second microphone 21B is installed, for example, on the ceiling of the second room 92. The second microphone 21B is communicably connected to the device management server 1C via the second repeater 4B. The second microphone 21B sends the collected audio information to the device management server 1C.

Figure 25:
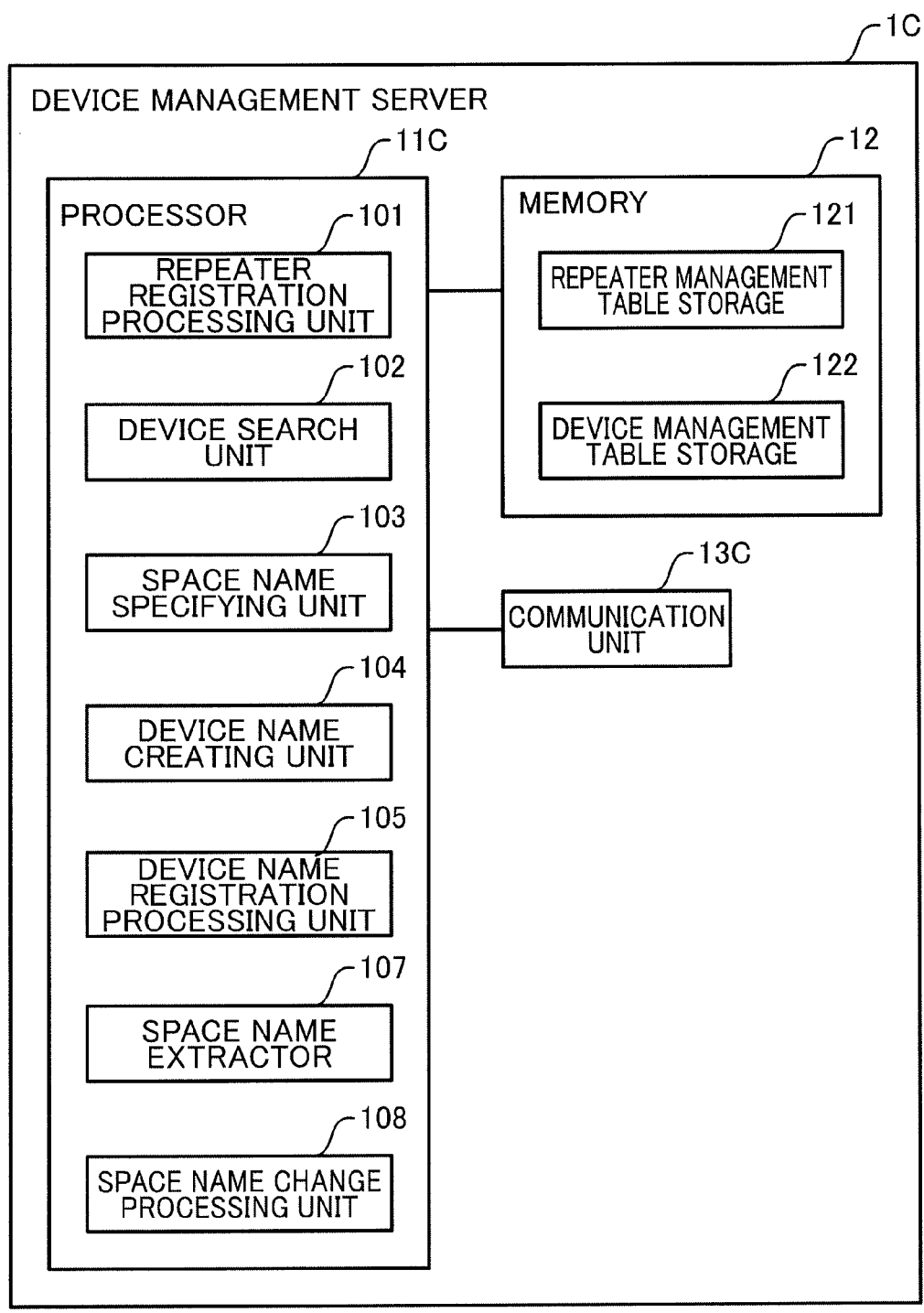
FIG. 25 is a diagram illustrating an example of a configuration of a device management server according to the fourth embodiment of the present disclosure.

FIG. 25 is a diagram illustrating an example of a configuration of the device management server 1C according to the fourth embodiment of the present disclosure.

The device management server 1C illustrated in FIG. 25 includes a processor 11C, a memory 12, and a communication unit 13C.

The processor 11C is, for example, a CPU. The processor 11C implements a repeater registration processing unit 101, a device search unit 102, a space name specifying unit 103, a device name creating unit 104, a device name registration processing unit 105, a space name extractor 107, and a space name change processing unit 108.

The communication unit 13C acquires audio information collected in the residence 9. The communication unit 13C acquires audio information from at least one microphone. The communication unit 13C receives the audio information sent by the first microphone 21A and the second microphone 21B. The first microphone 21A and the second microphone 21B send audio information during a predetermined time (for example, one minute) every predetermined time interval (for example, one minute).

The space name extractor 107 extracts the name of the room (space) included in the audio information acquired by the communication unit 13C. The space name extractor 107 converts the audio information into text data and extracts a word indicating a name of a room included in the text data. The space name extractor 107 extracts not only a word indicating a name of a room registered as a name of a room in the repeater management table but also words indicating various names of rooms. For example, the space name extractor 107 extracts not only names of general rooms such as a living room, a kitchen, a toilet, an entrance, and a bathroom, but also a word indicating a name of a room of a specific person such as a room of XX (XX is a name of one of family members).

The space name change processing unit 108 determines whether the name of the room (space) extracted by the space name extractor 107 exists among the names of the rooms (spaces) associated with the repeater management table (first table). In a case where the name of the room (space) extracted by the space name extractor 107 does not exist among the names of the rooms (spaces) associated with the repeater management table (first table), the space name change processing unit 108 outputs a room name change screen (change input screen) for presenting the extracted name of the room (space) to the user and receiving a change by the user of the name of the room (space) associated with the repeater management table (first table). In other words, in a case where the name of the room (space) extracted by the space name extractor 107 does not exist among the names of the rooms (spaces) associated with the repeater management table (first table), the space name change processing unit 108 sends, to the integrated terminal 3C, a room name change request for presenting the extracted name of the room (space) to the user and receiving a change by the user of the name of the room (space) associated with the repeater management table (first table).

Upon receipt of the room name change request, the integrated terminal 3C displays the room name change screen for presenting the extracted name of the room (space) to the user and receiving a change by the user of the name of the room (space) associated with the repeater management table. On the room name change screen, the integrated terminal 3C receives selection by the user of the name of the room (space) to be changed to the extracted name of the room (space) among the names of the rooms (spaces) associated with the repeater management table. The integrated terminal 3C sends change result information to the device management server 1C. The change result information includes information indicating the name of the room to be changed selected by the user.

When the change result information is received, the space name change processing unit 108 determines whether the name of the room has been changed. In a case where the name of the room has been changed, the space name change processing unit 108 registers the repeater identification information in which the name of the room has been changed and the changed name of the room in the repeater management table in association with each other.

The following is a description of room name change processing by the device management system according to the fourth embodiment of the present disclosure. Repeater registration processing and device name registration processing by the device management system according to the fourth embodiment are the same as the repeater registration processing and the device name registration processing in the first to third embodiments.

Figure 26:
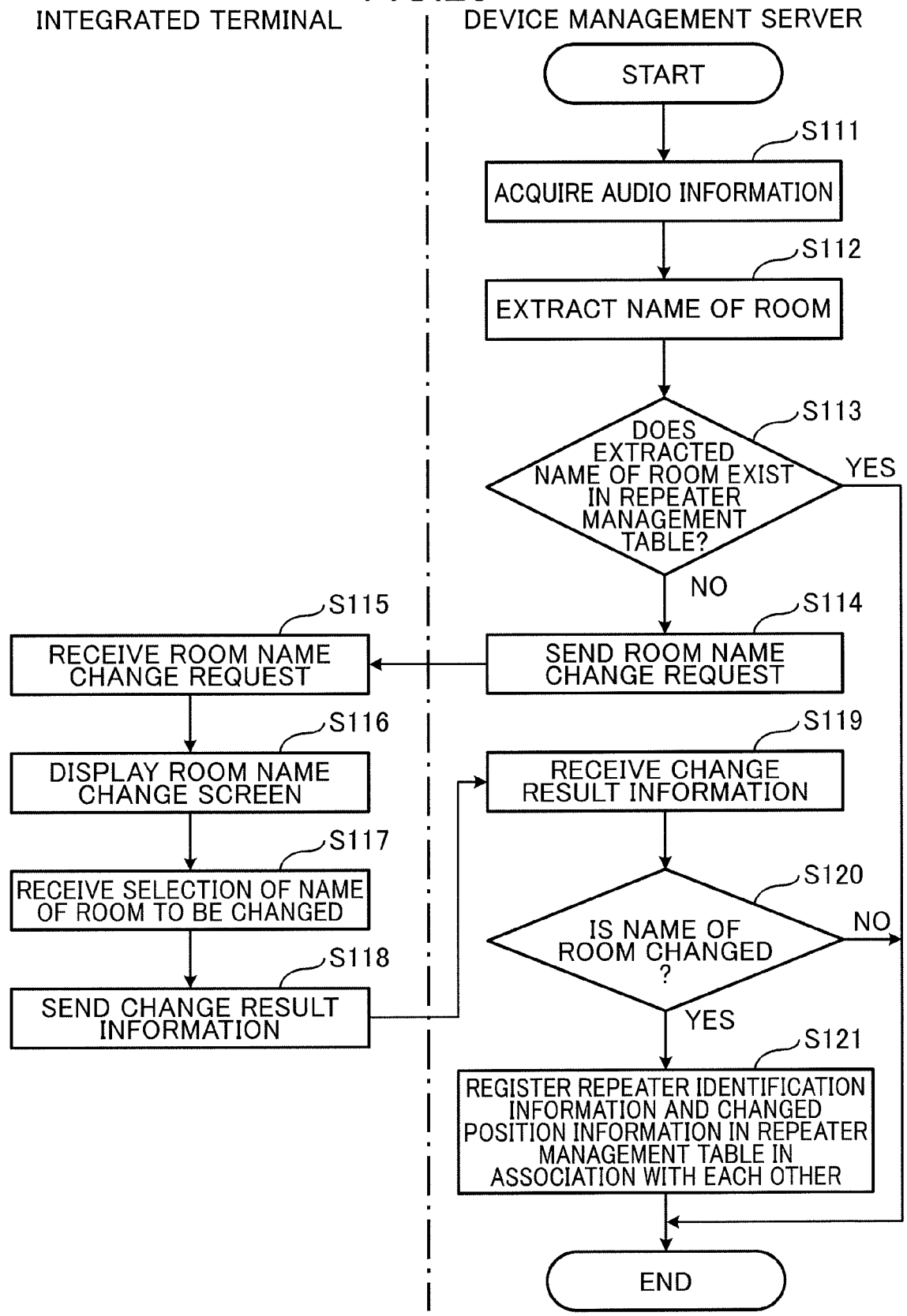
FIG. 26 is a flowchart for describing room name change processing by the device management system according to the fourth embodiment of the present disclosure.

FIG. 26 is a flowchart for describing the room name change processing by the device management system according to the fourth embodiment of the present disclosure.

First, in step S111, the communication unit 13C acquires audio information sent by the microphone.

Next, in step S112, the space name extractor 107 extracts the name of the room included in the audio information acquired by the communication unit 13C.

Then, in step S113, the space name change processing unit 108 determines whether the name of the room extracted by the space name extractor 107 exists among the names of the rooms associated with the repeater management table.

Here, when it is determined that the extracted name of the room exists among the names of the rooms associated with the repeater management table (YES in step S113), the room name change processing ends.

On the other hand, when it is determined that the extracted name of the room does not exist among the names of the rooms associated with the repeater management table (NO in step S113), in step S114, the space name change processing unit 108 presents the extracted name of the room to the user, and sends, to the integrated terminal 3C, a room name change request for receiving a change by the user of the name of the room associated with the repeater management table.

Next, in step S115, the integrated terminal 3C receives the room name change request sent by the device management server 1C.

Then, in step S116, the integrated terminal 3C displays the room name change screen for presenting the extracted name of the room to the user and receiving a change by the user of the name of the room associated with the repeater identification information.

Subsequently, in step S117, the integrated terminal 3C receives selection by the user of the name of the room to be changed from among the names of at least one room associated with the repeater identification information.

Next, in step S118, the integrated terminal 3C sends change result information including the name of the room selected by the user to the device management server 1C.

Figure 27:
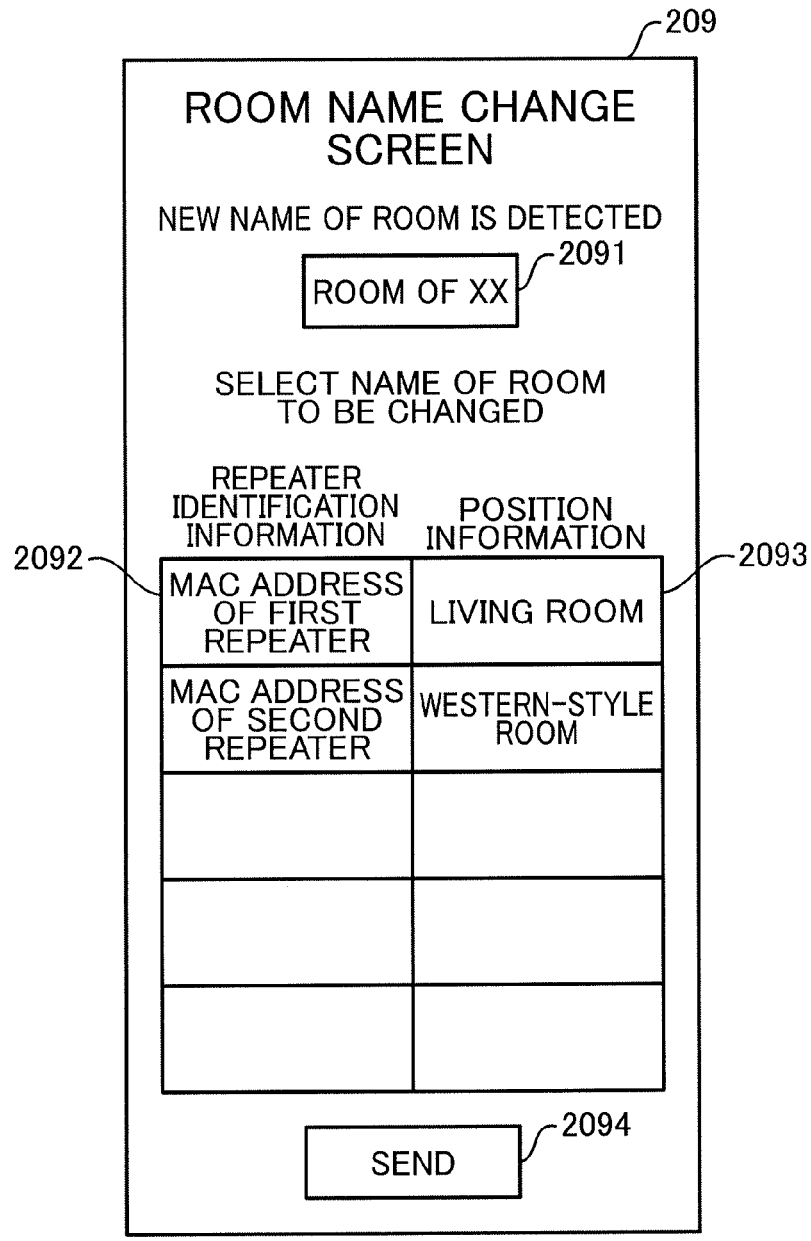
FIG. 27 is a diagram illustrating an example of a room name change screen displayed on an integrated terminal according to the fourth embodiment.

FIG. 27 is a diagram illustrating an example of the room name change screen displayed on the integrated terminal 3C according to the fourth embodiment.

The integrated terminal 3C displays a room name change screen 209 illustrated in FIG. 27. The room name change screen 209 includes a room name presentation field 2091 for presenting a new name of a room, an identification information presentation field 2092 for presenting at least one repeater identification information, and a position information selection field 2093 for selecting a name of a room to be changed. On the room name change screen 209, the user who uses the residence 9 selects the position information to be changed to the new name of the room from the position information corresponding to at least one repeater identification information.

Here, "room of XX" is displayed in the room name presentation field 2091 as the newly extracted name of the room. The first repeater 4A and the second repeater 4B are connected to the first LAN 7, and the MAC address of the first repeater 4A and the MAC address of the second repeater 4B are displayed in the identification information presentation field 2092. As the position information for the MAC address of the first repeater 4A, the living room which is the name of the room in which the first repeater 4A is installed is selectively displayed in the position information selection field 2093. As the position information for the MAC address of the second repeater 4B, the western-style room which is the name of the room in which the second repeater 4B is installed is selectively displayed in the position information selection field 2093.

When changing the name of the room associated with the MAC address of the second repeater 4B, the user selects "western-style room" which is the name of the room associated with the MAC address of the second repeater 4B.

The room name change screen 209 also includes a send button 2094 for sending change result information including the selected name of the room to be changed. When the send button 2094 is touched, the change result information including the name of the selected room to be changed is sent to the device management server 1C. Note that, when not changing the name of the room, the user may touch the send button 2094 without selecting the name of the room. In this case, the integrated terminal 3C sends change result information indicating that the name of the room is not changed to the device management server 1C.

Next, referring to FIG. 26, in step S119, the communication unit 13C of the device management server 1C receives the change result information sent by the integrated terminal 3C.

Then, in step S120, the space name change processing unit 108 determines whether the name of the room has been changed. Here, when it is determined that the name of the room has not been changed (NO in step S120), the room name change processing ends.

On the other hand, when it is determined that the name of the room has been changed (YES in step S120), in step S121, the space name change processing unit 108 registers the repeater identification information and the changed position information (name of the room) in the repeater management table in association with each other.

As described above, a designation of a room registered in the repeater management table may change over time. Therefore, when a name of a room not registered in the repeater management table is uttered in the residence 9, the name of the room registered in the repeater management table is changed to the name of the room not registered in the repeater management table extracted from the audio information, and thus the name of the device according to the current designation of the room can be created.

In the fourth embodiment, the name of the room associated with the repeater identification information in the repeater management table is changed, but the present disclosure is not limited thereto. The name of the device associated with the device identification information in the device management table may be changed.

Fifth Embodiment

In the fourth embodiment, when the name of the space included in the audio information is extracted and the extracted name of the space does not exist among the names of the spaces associated with the repeater management table, the change by the user of the name of the space to be changed is received from at least one name of a space associated with the repeater management table. On the other hand, in a fifth embodiment, the number of times the name of each of a plurality of spaces is uttered is counted on the basis of the extracted name of the space. Then, in a case where the extracted name of the space is not included among the names of the spaces associated with the repeater management table, a name of a space that has a smaller number of times of utterance than a threshold is specified among the names of the plurality of spaces. After that, a change input screen for receiving input by the user as to whether to change the specified name of the space to the extracted name of the space is output.

Figure 28:
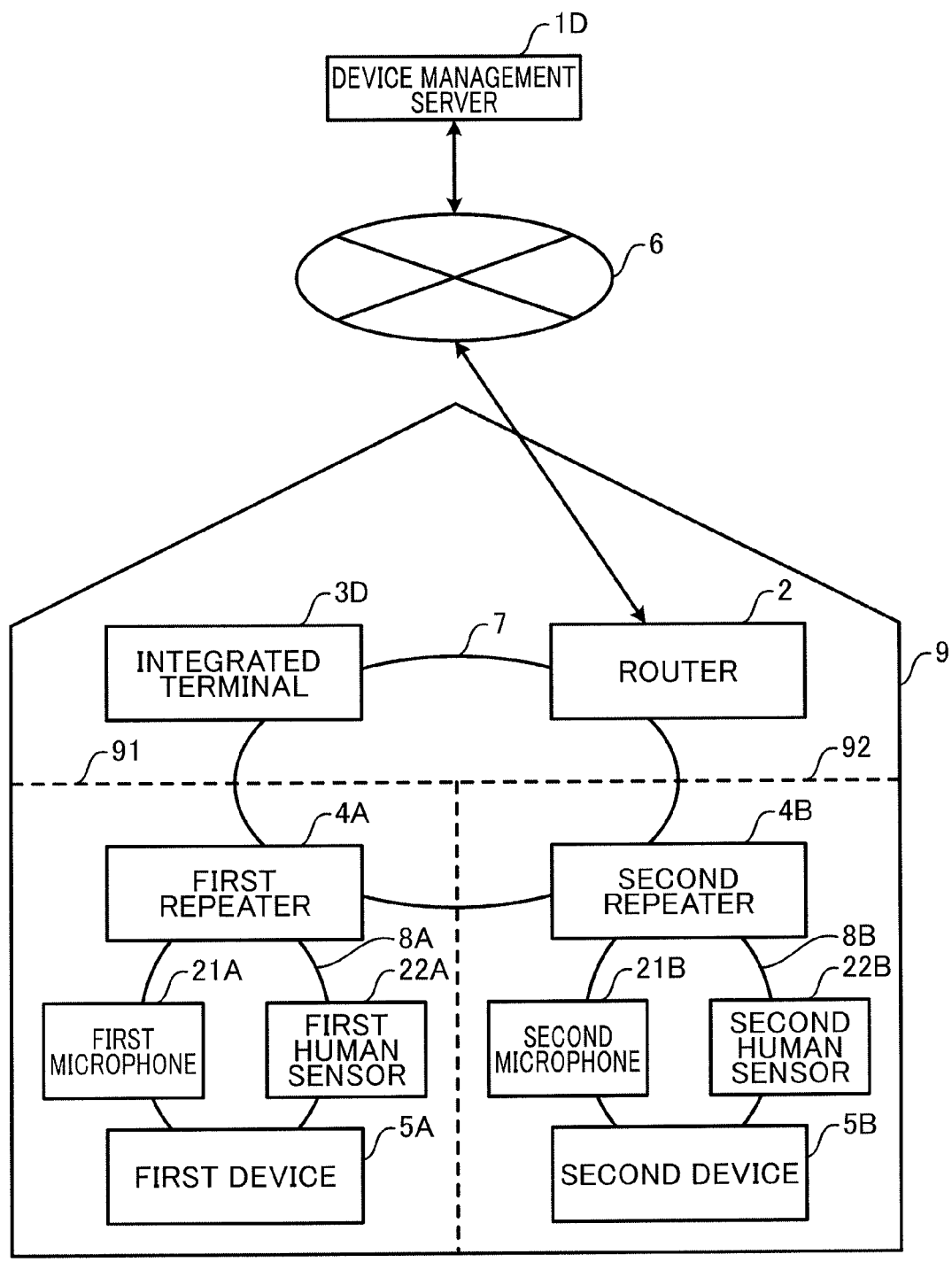
FIG. 28 is a diagram illustrating an example of a configuration of a device management system according to a fifth embodiment of the present disclosure.

FIG. 28 is a diagram illustrating an example of a configuration of a device management system according to the fifth embodiment of the present disclosure.

The device management system illustrated in FIG. 28 includes a device management server 1D, a router 2, an integrated terminal 3D, a first repeater 4A, a second repeater 4B, a first device 5A, a second device 5B, a first microphone 21A, a second microphone 21B, a first human sensor 22A, and a second human sensor 22B. In the fifth embodiment, the same components as those in the first and fourth embodiments are denoted by the same reference signs, and description thereof will be omitted.

A human sensor that detects a person is installed in each room in the residence 9.

The first human sensor 22A is installed in the first room 91, and detects a person in the first room 91. The first human sensor 22A is installed, for example, on the ceiling of the first room 91. The first human sensor 22A is communicably connected to the device management server 1D via the first repeater 4A. When detecting a person, the first human sensor 22A sends sensing data indicating that a person is detected to the device management server 1D.

The second human sensor 22B is installed in the second room 92, and detects a person in the second room 92. The second human sensor 22B is installed, for example, on the ceiling of the second room 92. The second human sensor 22B is communicably connected to the device management server 1D via the second repeater 4B. When detecting a person, the second human sensor 22B sends sensing data indicating that a person is detected to the device management server 1D.

Figure 29:
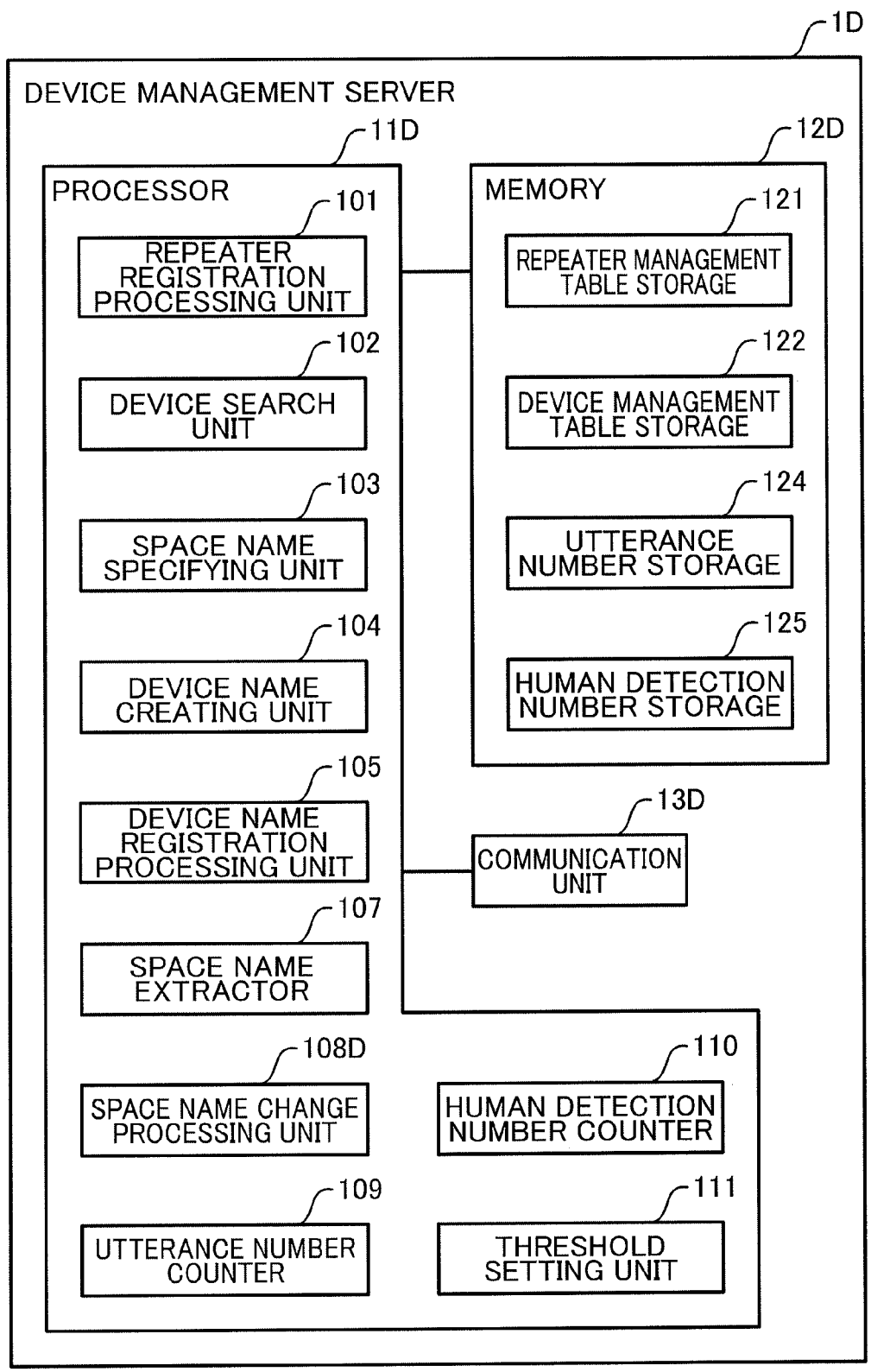
FIG. 29 is a diagram illustrating an example of a configuration of a device management server according to the fifth embodiment of the present disclosure.

FIG. 29 is a diagram illustrating an example of a configuration of the device management server 1D according to the fifth embodiment of the present disclosure.

The device management server 1D illustrated in FIG. 29 includes a processor 11D, a memory 12D, and a communication unit 13D.

The processor 11D is, for example, a CPU. The processor 11D implements a repeater registration processing unit 101, a device search unit 102, a space name specifying unit 103, a device name creating unit 104, a device name registration processing unit 105, a space name extractor 107, a space name change processing unit 108D, an utterance number counter 109, human detection number counter 110, and threshold setting unit 111.

The memory 12D is a storage device capable of storing various types of information, such as a RAM, an HDD, an SSD, or a flash memory. The memory 12D implements a repeater management table storage 121, a device management table storage 122, an utterance number storage 124, and a human detection number storage 125.

The utterance number counter 109 counts the number of times each name of a plurality of rooms (spaces) has been uttered on the basis of the names of the rooms (spaces) extracted by the space name extractor 107.

The utterance number storage 124 stores the number of times each name of the plurality of rooms (spaces) counted by the utterance number counter 109 has been uttered. The utterance number storage 124 stores the names of the plurality of rooms (spaces) and the number of times of utterance of the name of each room (space) in association with each other.

The communication unit 13D acquires sensing data from the human sensor that detects a person, the human sensor being installed in each of the plurality of spaces.

The human detection number counter 110 counts the number of times a person is detected in each of the plurality of rooms (spaces) on the basis of the sensing data acquired by the communication unit 13D. The sensing data includes not only information indicating that a person is detected but also identification information for identifying the human sensor. The device management server 1D stores a table in which the identification information of the human sensor and the name of the room in which the human sensor is installed are associated in advance. Therefore, the human detection number counter 110 can determine in which room a person is detected on the basis of the received sensing data.

The human detection number storage 125 stores the number of times a person is detected in the plurality of rooms (spaces) by the human detection number counter 110. The human detection number storage 125 stores the names of the plurality of rooms (spaces) and the number of times a person is detected in each room (space) in association with each other.

The threshold setting unit 111 calculates a frequency of presence of a person in each of the plurality of rooms (spaces) on the basis of the acquired sensing data. The threshold setting unit 111 sets a threshold lower for a room (space) having a higher calculated frequency.

The space name change processing unit 108D determines whether the name of the room (space) extracted by the space name extractor 107 is included among the names of the rooms (spaces) associated with the repeater management table (first table). In a case where the name of the room (space) extracted by the space name extractor 107 is not included among the names of the rooms (spaces) associated with the repeater management table (first table), the space name change processing unit 108D specifies a name of a room (space) that has a smaller number of times of utterance than the threshold among the names of the plurality of rooms (spaces). The space name change processing unit 108D outputs a room name change screen (change input screen) for receiving input by the user as to whether to change the specified name of the room (space) to the extracted name of the room (space). That is, the space name change processing unit 108D sends, to the integrated terminal 3D, a room name change request for receiving the input by the user as to whether to change the specified name of the room (space) to the extracted name of the room (space).

If a room of which name is not uttered by a person, there is a high possibility that the designation of the room has been changed. Thus, the device management server 1D prompts the user to change the name of the room that has a smaller number of times of utterance than the threshold to a name of an unregistered room included in the audio information. A name of a room that has a high frequency of presence of a person is referred to by a person less frequently. Therefore, by setting the threshold lower for a room that has a higher frequency of detection of a person, it is possible to prevent a name of a room that has a higher frequency of presence of the user from being changed.

The following is a description of room name change processing by the device management system according to the fifth embodiment of the present disclosure. Repeater registration processing and device name registration processing by the device management system according to the fifth embodiment are the same as the repeater registration processing and the device name registration processing in the first to third embodiments.

Figure 30:
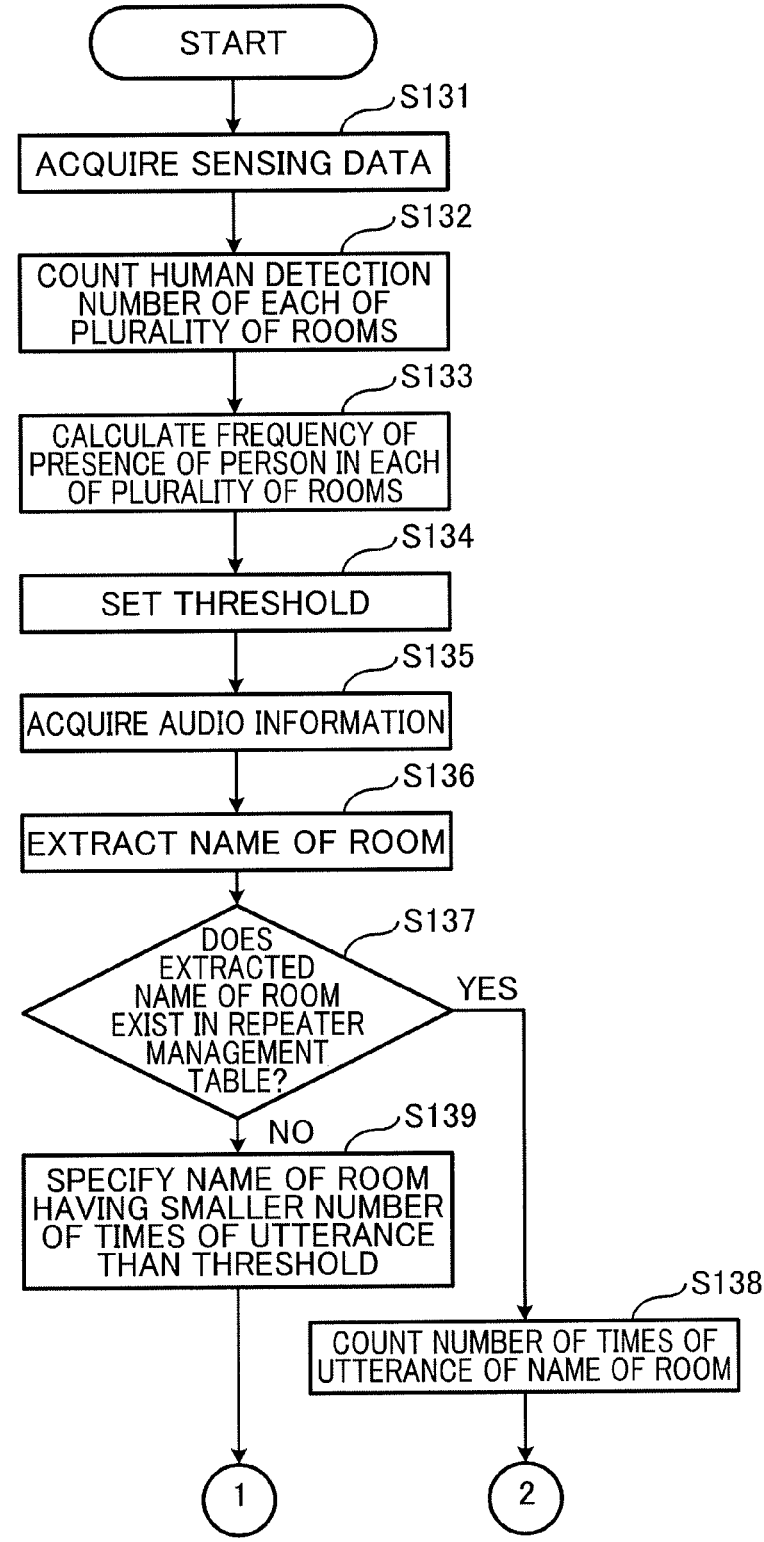
FIG. 30 is a first flowchart for describing room name change processing by the device management system according to the fifth embodiment of the present disclosure.

FIG. 30 is a first flowchart for describing the room name change processing by the device management system according to the fifth embodiment of the present disclosure, and FIG. 31 is a second flowchart for describing the room name change processing by the device management system according to the fifth embodiment of the present disclosure.

First, in step S131, the communication unit 13D acquires sensing data from the human sensor installed in each of the plurality of spaces.

Next, in step S132, the human detection number counter 110 counts the number of times of detection of a person in each of the plurality of rooms (spaces) on the basis of the sensing data acquired by the communication unit 13D. The human detection number counter 110 adds the counted number of times of detection of a person in each room to the number of times of detection of a person in each room stored in the human detection number storage 125.

Then, in step S133, the threshold setting unit 111 calculates the frequency of presence of a person in each of the plurality of rooms on the basis of the number of times of detection of a person in each of the plurality of rooms.

Subsequently, in step S134, the threshold setting unit 111 sets a threshold for each of the plurality of rooms on the basis of the calculated frequency of presence of a person in each of the plurality of rooms. The threshold is used for comparison with the number of times of utterance. At this time, the threshold setting unit 111 sets a threshold lower for a room having a higher frequency of presence of a person.

Since processing of steps S135 to S137 is the same as the processing of steps S111 to S113 illustrated in FIG. 26, description thereof will be omitted.

When it is determined that the extracted name of the room exists among the names of the rooms associated with the repeater management table (YES in step S137), in step S138, the utterance number counter 109 counts the number of times each name of the plurality of rooms has been uttered on the basis of the name of the room extracted by the space name extractor 107. The utterance number counter 109 adds the counted number of times of utterance of each room to the number of times of utterance of each room stored in the utterance number storage 124. After the processing of step S138 is performed, the room name change processing ends.

On the other hand, when it is determined that the extracted name of the room does not exist among the names of the rooms associated with the repeater management table (NO in step S137), in step S139, the space name change processing unit 108D specifies a name of a room that has a smaller number of times of utterance than the threshold among the names of the plurality of rooms.

Next, in step S140, the space name change processing unit 108D sends, to the integrated terminal 3D, a room name change request for receiving the input by the user as to whether to change the specified name of the room to the extracted name of the room.

Then, in step S141, the integrated terminal 3D receives the room name change request sent by the device management server 1D.

Subsequently, in step S142, the integrated terminal 31) displays a room name change screen for receiving input by the user as to whether to change the name of a room that has a smaller number of times of utterance than the threshold to the extracted name of the room.

Next, in step S143, the integrated terminal 3D receives the input by the user as to whether to change the name of the room that has a smaller number of times of utterance than the threshold to the extracted name of the room.

Then, in step S144, the integrated terminal 3D sends, to the device management server 1D, change result information indicating whether to change the name of the room that has a smaller number of times of utterance than the threshold to the extracted name of the room.

FIG. 32 is a diagram illustrating an example of the room name change screen displayed on the integrated terminal 3D according to the fifth embodiment.

The integrated terminal 3D displays a room name change screen 210 illustrated in FIG. 32. The room name change screen 210 includes a room name presentation field 2101 for presenting a new name of a room, and a position information presentation field 2102 for presenting repeater identification information corresponding to a room that has a smaller number of times of utterance than the threshold, and a name of a room (position information) that has a smaller number of times of utterance than the threshold. On the room name change screen 210, the user who uses the residence 9 inputs whether to change the name of the room that has a smaller number of times of utterance than the threshold to a new name of a room.

Here, "room of XX" is displayed in the room name presentation field 2101 as the newly extracted name of the room. The MAC address of the second repeater 4B installed in a room that has a smaller number of times of utterance than the threshold and a western-style room which is the name of the room that has a smaller number of times of utterance than the threshold are displayed in the position information presentation field 2102.

The room name change screen 210 includes a change permission button 2103 for permitting a name of a room that has a smaller number of times of utterance than the threshold to be changed to the extracted name of the room, and a change rejection button 2104 for rejecting a name of a room that has a smaller number of times of utterance than the threshold to be changed to the extracted name of the room. When the change permission button 2103 is touched, change result information indicating that the name of the room that has a smaller number of times of utterance than the threshold is changed to the extracted name of the room is sent to the device management server 1D. On the other hand, when the change rejection button 2104 is touched, change result information indicating that the name of the room that has a smaller number of times of utterance than the threshold is not changed to the extracted name of the room is sent to the device management server 1D.

Note that, in a case where there are names of a plurality of rooms that have a smaller number of times of utterance than the threshold, the space name change processing unit 108D may specify a name of a room that has the smallest number of times of utterance. In a case where there are names of a plurality of rooms that have a smaller number of times of utterance than the threshold, the space name change processing unit 108D may present the user with the names of the plurality of rooms that have the smallest number of times of utterance than the threshold, and receive selection of a name of a room to be changed. Furthermore, in a case where there are names of a plurality of rooms that have a smaller number of times of utterance than the threshold, the room name change processing may end.

Next, referring to FIG. 31, in step S145, the communication unit 13D of the device management server 1D receives the change result information sent by the integrated terminal 3D.

Then, in step S146, the space name change processing unit 108D determines whether a change of the name of the room has been instructed. Here, when it is determined that a change of the name of the room has not been instructed (NO in step S146), the room name change processing ends.

On the other hand, when it is determined that a change of the name of the room has been instructed (YES in step S146), in step S147, the space name change processing unit 108D registers the repeater identification information and the changed position information (name of the room) in the repeater management table in association with each other.

As described above, among the names of the plurality of rooms registered in the repeater management table, the name of the room that has a smaller number of times of utterance than the threshold is likely to be the name of the room that is no longer referred to by the user. Therefore, since a name of a room that has a smaller number of times of utterance than the threshold among the names of the plurality of rooms registered in the repeater management table is changed to the name of the room not registered in the repeater management table extracted from the audio information, and the name of the device according to the current designation of the room can be created.

In the fifth embodiment, the name of the room associated with the repeater identification information in the repeater management table is changed, but the present disclosure is not limited thereto. The name of the device associated with the device identification information in the device management table may be changed.

In each of the above embodiments, each component may be implemented by being configured with dedicated hardware or by executing a software program suitable for each component. Each component may be implemented by a program execution unit such as a CPU or a processor reading and executing a software program recorded on a recording medium such as a hard disk or a semiconductor memory. Alternatively, the program may be executed by another independent computer system by recording and transferring the program on a recording medium or transferring the program via a network.

Some or all of the functions of the devices according to the embodiments of the present disclosure are implemented as large scale integration (LSI), which is typically an integrated circuit. These may be individually integrated into one chip, or may be integrated into one chip so as to include some or all of the functions. The integrated circuit is not limited to the LSI, and may be implemented by a dedicated circuit or a general purpose processor. A field programmable gate array (FPGA) that can be programmed after manufacturing of LSI or a reconfigurable processor in which connections and settings of circuit cells inside LSI can be reconfigured may be used.

Some or all of the functions of the devices according to the embodiments of the present disclosure may be implemented by execution of a program by a processor such as a CPU.

The numbers used above are merely examples for specifically describing the present disclosure, and the present disclosure is not limited to the illustrated numbers.

The order in which each step illustrated in the above flowchart is executed is for specifically describing the present disclosure, and may be an order other than the above order as long as a similar effect can be obtained. Some of the above steps may be executed simultaneously (concurrently) with other steps.

The technique of the present disclosure can easily create the name of the device that can be identified by the user, simplify complicated creation of the name of the device, and is therefore useful as a technique for creating a name of a device installed in the indoor environment.

The invention claimed is:

1. An information processing method, by a computer, comprising:
    acquiring, from a device installed in an indoor environment, first identification information for identifying a position specifying device installed in a predetermined space among a plurality of spaces that are included in the indoor environment, and second identification information for identifying the device installed in the indoor environment;
    referring to a first table in which the first identification information for identifying the position specifying device and a name of the space in which the position specifying device is installed are associated to each other in advance, and specifying in a first specifying operation a name of a space associated with the acquired first identification information;
    generating a name of the device by using the name of the specified space;
    registering the acquired second identification information in association with the generated name of the device in a second table;
    acquiring audio information in the indoor environment;
    extracting a name of a space included in the audio information;

counting a number of times names of the plurality of spaces have been uttered based on the extracted name of the space; and in a case where the extracted name of the space is not included in the name of the space associated with the first table, specifying in a second specifying operation a name of a space uttered fewer times than a threshold number of times the name is uttered among the names of the plurality of spaces, and outputting a change input screen for receiving input by the user as to whether to change the name of the space specified in the second specifying operation to the name of the extracted space.

2. The information processing method according to claim 1, wherein the position specifying device is a network connection device used by the device installed in the indoor environment to connect to a network, and the device installed in the indoor environment is communicably connected to the computer via the network connection device.

3. The information processing method according to claim 2, wherein the network connection device is installed in each of two or more spaces among the plurality of spaces, and the specifying of the name of the space in the first specifying operation includes specifying a name of a space associated with the first identification information for identifying a network connection device installed in a space in which the device installed in the indoor environment is installed among two or more network connection devices installed in the two or more spaces.

4. The information processing method according to claim 1, wherein the position specifying device is a signal transmitter that transmits a wireless signal including the first identification information, and the device installed in the indoor environment receives the wireless signal transmitted by the signal transmitter and sends the first identification information included in the wireless signal having been received to the computer.

5. The information processing method according to claim 4, wherein the signal transmitter is installed in each of two or more spaces among the plurality of spaces, and the specifying of the name of the space in the first specifying operation includes specifying a name of a space associated with the first identification information for identifying a signal transmitter installed in a space in which the device installed in the indoor environment is installed among two or more signal transmitters installed in the two or more spaces.

6. The information processing method according to claim 1, wherein the generating of the name of the device installed in the indoor environment includes generating, as the name of the device installed in the indoor environment, the name of the specified space.

7. The information processing method according to claim 1, wherein the generating of the name of the device installed in the indoor environment includes acquiring a type of the device installed in the indoor environment received on a type input screen for displaying the name of the specified space, and receiving input of the type of the device, and generating the name of the device installed in the indoor environment based on the type of the device installed in the indoor environment having been acquired and the name of the space.

8. The information processing method according to claim 1, wherein the acquiring of the first identification information and the second identification information includes further acquiring the type of the device installed in the indoor environment, and the generating of the name of the device installed in the indoor environment includes generating the name of the device installed in the indoor environment by combining the name of the specified space and the acquired type of the device installed in the indoor environment.

9. The information processing method according to claim 1, further comprising:

acquiring sensing data from a sensor that detects a person, the sensor being installed in each of the plurality of spaces;

calculating a frequency of presence of the person in each of the plurality of spaces based on the acquired sensing data; and setting the threshold number of times the name is uttered to be lower for a space in which the calculated frequency is higher.

10. A non-transitory computer readable recording medium storing an information processing program that causes a computer to perform processing of:

acquiring, from a device installed in an indoor environment, first identification information for identifying a position specifying device installed in a predetermined space among a plurality of spaces that are included in the indoor environment, and second identification information for identifying the device installed in the indoor environment;

referring to a first table in which the first identification information for identifying the position specifying device and a name of the space in which the position specifying device is installed are associated to each other in advance, and specifying in a first specifying operation a name of a space associated with the acquired first identification information;

generating a name of the device by using the name of the specified space;

registering the acquired second identification information in association with and the generated name of the device in a second table acquiring audio information in the indoor environment;

extracting a name of a space included in the audio information;

counting a number of times names of the plurality of spaces have been uttered based on the extracted name of the space; and in a case where the extracted name of the space is not included in the name of the space associated with the first table, specifying in a second specifying operation a name of a space uttered fewer times than a threshold number of times the name is uttered among the names of the plurality of spaces, and outputting a change input screen for receiving input by the user as to whether to change the name of the space specified in the second specifying operation to the name of the extracted space.

11. An information processing device comprising:
a processor configured to
- acquire, from a device installed in an indoor environment, first identification information for identifying a position specifying device installed in a predetermined space among a plurality of spaces that are included in the indoor environment, and second identification information for identifying the device installed in the indoor environment;
- refer to a first table in which the first identification information for identifying the position specifying device and a name of the space in which the position specifying device is installed are associated to each other in advance, and specify in a first specifying operation a name of a space associated with the acquired first identification information;
- generate a name of the device by using the name of the specified space;
- register the acquired second identification information in association with the generated name of the device in a second table;
- acquire audio information in the indoor environment;
- extract a name of a space included in the audio information;
- count a number of times names of the plurality of spaces have been uttered based on the extracted name of the space; and
- in a case where the extracted name of the space is not included in the name of the space associated with the first table,
- specify in a second specifying operation a name of a space uttered fewer times than a threshold number of times the name is uttered among the names of the plurality of spaces, and
- output a change input screen for receiving input by the user as to whether to change the name of the space specified in the second specifying operation to the name of the extracted space.

* * * * *